(12) United States Patent
Turner et al.

(10) Patent No.: US 12,079,748 B2
(45) Date of Patent: Sep. 3, 2024

(54) CO-OPERATIVE RESOURCE POOLING SYSTEM

(71) Applicant: Trovata, Inc., San Diego, CA (US)

(72) Inventors: Brett Turner, San Diego, CA (US); Joseph Drambarean, Encinitas, CA (US)

(73) Assignee: TROVATA, INC., San Diego, CA (US)

( * ) Notice: Subject to any disclaimer, the term of this patent is extended or adjusted under 35 U.S.C. 154(b) by 693 days.

(21) Appl. No.: 17/133,106

(22) Filed: Dec. 23, 2020

(65) Prior Publication Data

US 2021/0117889 A1 Apr. 22, 2021

Related U.S. Application Data

(63) Continuation-in-part of application No. 17/072,940, filed on Oct. 16, 2020, now Pat. No. 11,907,321, and a continuation-in-part of application No. 15/828,254, filed on Nov. 30, 2017, now abandoned.

(60) Provisional application No. 62/956,063, filed on Dec. 31, 2019, provisional application No. 62/955,242, filed on Dec. 30, 2019, provisional application No. 62/923,349, filed on Oct. 18, 2019, provisional application No. 62/429,002, filed on Dec. 1, 2016.

(51) Int. Cl.
*G06Q 10/0631* (2023.01)
*G06F 16/22* (2019.01)
*G06Q 20/14* (2012.01)

(52) U.S. Cl.
CPC ... *G06Q 10/06312* (2013.01); *G06F 16/2272* (2019.01); *G06Q 10/06315* (2013.01); *G06Q 20/14* (2013.01)

(58) Field of Classification Search
CPC ....... G06Q 10/06312; G06Q 10/06315; G06Q 20/14; G06F 16/2272
USPC ...................................................... 705/36 R
See application file for complete search history.

(56) References Cited

U.S. PATENT DOCUMENTS

| | | | |
|---|---|---|---|
| 6,411,974 | B1 | 6/2002 | Graham et al. |
| 7,243,156 | B2 | 7/2007 | Hahn et al. |
| 7,835,976 | B2 | 11/2010 | Hagerman et al. |
| 8,099,354 | B2 | 1/2012 | Hagerman et al. |
| 8,190,504 | B1 | 5/2012 | Stolz et al. |

(Continued)

FOREIGN PATENT DOCUMENTS

WO 2013011545 A1 1/2013

OTHER PUBLICATIONS

10 Tips for Moving from Static Budgets to Rolling Forecasts, Vena Solutions.

(Continued)

*Primary Examiner* — Hope C Sheffield
(74) *Attorney, Agent, or Firm* — Rowan TELS LLC

(57) ABSTRACT

A method of operating a resource pooling system involves receiving resource deposits from a first set of member companies into a resource pool, the resource deposits that includes excess resources for operating the first set of member companies. The method lends resources from the resource pool to a second set of member companies in response to each company of the second set of member companies requesting resources in an amount that exceeds a total resource deposit for the company. In the method, the first set of member companies and the second set of member companies form a resource co-operative.

22 Claims, 28 Drawing Sheets

(56) References Cited

U.S. PATENT DOCUMENTS

| | | | |
|---|---|---|---|
| 8,583,053 | B1 | 11/2013 | Mahbod et al. |
| 8,676,689 | B1 | 3/2014 | Whelan |
| 8,768,809 | B1 * | 7/2014 | Cole ................ G06Q 40/02 705/35 |
| 2003/0182230 | A1 * | 9/2003 | Pessin .............. G06Q 40/04 705/39 |
| 2004/0021659 | A1 | 2/2004 | Peercy et al. |
| 2004/0153504 | A1 | 8/2004 | Hutchinson et al. |
| 2005/0018784 | A1 | 1/2005 | Kurobe et al. |
| 2006/0047588 | A1 * | 3/2006 | Lal .................. G06Q 40/02 705/30 |
| 2006/0095367 | A1 | 5/2006 | Iverson |
| 2008/0098014 | A1 | 4/2008 | Eichstaedt et al. |
| 2009/0276419 | A1 | 11/2009 | Jones et al. |
| 2010/0131424 | A1 | 5/2010 | Moséet al. |
| 2012/0123872 | A1 | 5/2012 | Chiu et al. |
| 2013/0159832 | A1 * | 6/2013 | Ingargiola .......... G06Q 40/00 715/220 |
| 2013/0262394 | A1 | 10/2013 | Kumarasamy et al. |
| 2015/0032506 | A1 | 1/2015 | Kim et al. |
| 2015/0082218 | A1 | 3/2015 | Affoneh et al. |
| 2015/0348067 | A1 | 12/2015 | Deegan et al. |
| 2016/0019504 | A1 | 1/2016 | Ghosh |
| 2017/0053344 | A1 | 2/2017 | Yaplee et al. |
| 2017/0103468 | A1 | 4/2017 | Orsini et al. |
| 2017/0178154 | A1 | 6/2017 | Wegener et al. |
| 2017/0236119 | A1 | 8/2017 | Kamensky et al. |
| 2017/0323394 | A1 | 11/2017 | Campione |
| 2018/0130130 | A1 | 5/2018 | Dechu et al. |
| 2018/0158146 | A1 | 6/2018 | Turner et al. |
| 2021/0142399 | A1 | 5/2021 | Joliveau |
| 2021/0248151 | A1 | 8/2021 | Kadel et al. |
| 2022/0147895 | A1 | 5/2022 | Katz et al. |

OTHER PUBLICATIONS

Financial Forecasting Guide—Learn to Forecast Revenues, Expenses, Corporate Financial Institute.

Decoupling Interfaces from Implementation—Using Separated Interfaces by Gervasio (Year: 2012).

* cited by examiner

POSITIONS
Balances
Transactions
Analysis
Tags
Reports

FORECAST
Forecast
Snapshots

CONFIGURATIONS
Accounts
Groups
Plan
Connections
Admin

Accounts — 400

Bank of America — Active ●  >

Barclays — Active ●  <

402

| Account # | Type | Nickname | In Cash Targeted Forecast Balance | | Entity | Region | Division |
|---|---|---|---|---|---|---|---|
| ****2732 | Operating ▽ | Payroll | ■ € 17,000,000 | EUR | Antenna So... ▷ | US-East ▷ | Cash Pool B |
| ****4628 | Operating ▽ | Payments | ■ € 750,000 | EUR | Pegasystem... ▷ | EMEA ▷ | Cash Pool B |
| ****9064 | Operating ▽ | Collections | ■ £ 1,000.00 | GBP | Profeatable... ▷ | US-North ▷ | Cash Pool A |

JP Morgan — Active ●  <

| Account # | Type | Nickname | In Cash Targeted Forecast Balance | | Entity | Region | Division |
|---|---|---|---|---|---|---|---|
| ****1229 | Operating ▽ | Collections | ■ $1,500,000 | USD | Pegasystem... ▷ | US-South ▷ | Cash Pool A |
| ****1230 | Other ▽ | Standby LCs | ■ $0 | USD | Pegasystem... ▷ | US-West ▷ | Cash Pool B |

FIG. 4

Tag Creation

Settings
Tag name: Payroll (7/30)
Tag description: All payroll transactions
☑ Auto-Tag (24/500)

642

Tag Type
Parameter-Based    Tag-Based

644

Search: "adp" "payroll"
Institution: Silicon Valley Bank ⊗  Currency: USD ⊗
Type: Debit ⊗

From: Any Date    To: Any Date

646

Credit/Debit: Debit
Institutions: Silicon Valley Bank
Accounts
Currencies: USD

Preview  51 of 51 Transactions

| Date | Description | Bank | Account Number | | |
|------|-------------|------|----------------|---|---|
| Jun 28, 2019 | ADP PAYROLL FEES ADP - FEES 10... | Silicon Valley Bank | ****1150 | | |
| Dec 14, 2019 | ADP PAYROLL FEES ADP - FEES 10... | Silicon Valley Bank | ****1150 | ($ 52.70) | USD |
| Sep 14, 2018 | ADP PAYROLL FEES ADP - FEES 10... | Silicon Valley Bank | ****1150 | | |
| Jul 27, 2018 | ADP PAYROLL FEES ADP - FEES 10... | Silicon Valley Bank | ****1150 | ($ 838.70) | USD |

648

652

Cancel    Save

FIG. 6C

CO-OPERATIVE RESOURCE POOLING SYSTEM

CROSS REFERENCE TO RELATED APPLICATIONS

This application claims priority and benefit under 35 USC 119(e) to US application Serial No. U.S. 62/956,063, filed on Dec. 31, 2019, the contents of which are incorporated herein by reference in their entirety. This application claims priority and benefit under 35 USC 119(e) to US application Serial No. U.S. 62/955,242, filed on Dec. 30, 2019, the contents of which are incorporated herein by reference in their entirety.

This application claims priority and benefit as a continuation in part of application Ser. No. 17/072,940, filed on Oct. 16, 2020, the contents of which are incorporated herein by reference in their entirety. Application Ser. No. 17/072,940 claims priority and benefit under 35 USC 119(e) to US application Serial No. U.S. 62/923,349, filed on Oct. 18, 2019, the contents of which are incorporated herein by reference in their entirety.

This application claims priority and benefit as a continuation in part of U.S. patent application Ser. No. 15/828,254, entitled "Financial operating platform for autonomous and semi-autonomous cash forecasting and projecting financial results", filed Nov. 30, 2017, the contents of which are incorporated herein by reference in their entirety. Application Ser. No. 15/828,254 claims priority and benefit under 35 USC 119(e) to U.S. application No. 62/429,002, filed on Dec. 1, 2016, the contents of which are incorporated herein by reference in their entirety.

BACKGROUND

An important function of operational management for any company is to manage the company's various resources. This involves managing both of resource inflows and resource outflows. It is common for a company's resource inflows to be different from its resource outflows over any given period, due to a variety of factors. The operational management function seeks to maintain adequate resources on hand to meet any operational requirements and/or obligations. It is also good practice to put to efficient purpose any excess resources beyond what is needed to meet a company's short-term obligations and to monetize said excess resources when possible.

Once determinations of resource requirements are made, operation management may work with third party institutions to borrow or lease resources needed to meet the company's short-term obligations; or work through said third party institutions to apply excess resources to generate income. The process of working with such third parties can be slow and cumbersome given internal systems and processes for qualifying and underwriting.

Functions performed in enterprise resource tracking, planning, and allocation have many interdependencies. However they often operate separately from one another as the skills required to perform the duties of each function are different. As a result, the systems used by each function, and the many work flows to produce desired results for each, may be disparate, poorly integrated, and may utilize inefficient manual processes. For example, most companies today still rely heavily on spreadsheets for many core or critical resource management tasks.

Conventional platforms or processes for enterprise resource allocation and planning generate a forecast, which is what a company estimates as its resource availability in the future. The forecast may be derived from various sources and compiled by staff. Once the data is gathered, it may be manually input or imported into spreadsheets (i.e., Microsoft Excel® or Google Sheets®, or the like), often within a forecasting model that is manually created, configured and maintained. A considerable amount of effort and analysis is often required and expended in computing the forecast using a spreadsheet. Once the forecast is determined, it may then be output to certain reports and communicated to managers for review and decision making. A resource flow statement may provide metrics on the inflow and outflow of resources for the company corresponding to completed transactions and may indicate the expected liquidity of the resource at a future point in time.

There is, therefore, an ongoing need for systems that enable the determination of an organization's resource position responsive to recent events and transactions, and to utilize this resource position to generate resource forecasts over configurable time intervals and scenarios.

BRIEF DESCRIPTION OF THE DRAWINGS

To easily identify the discussion of any particular element or act, the most significant digit or digits in a reference number refer to the figure number in which that element is first introduced.

FIG. 4 depicts a user interface 400 in accordance with one embodiment.

FIG. 6C depicts a user application program interface 652 for the tagging logic 640 of the distributed resource management computing platform 600 in accordance with one embodiment.

DETAILED DESCRIPTION

Figure 1A:
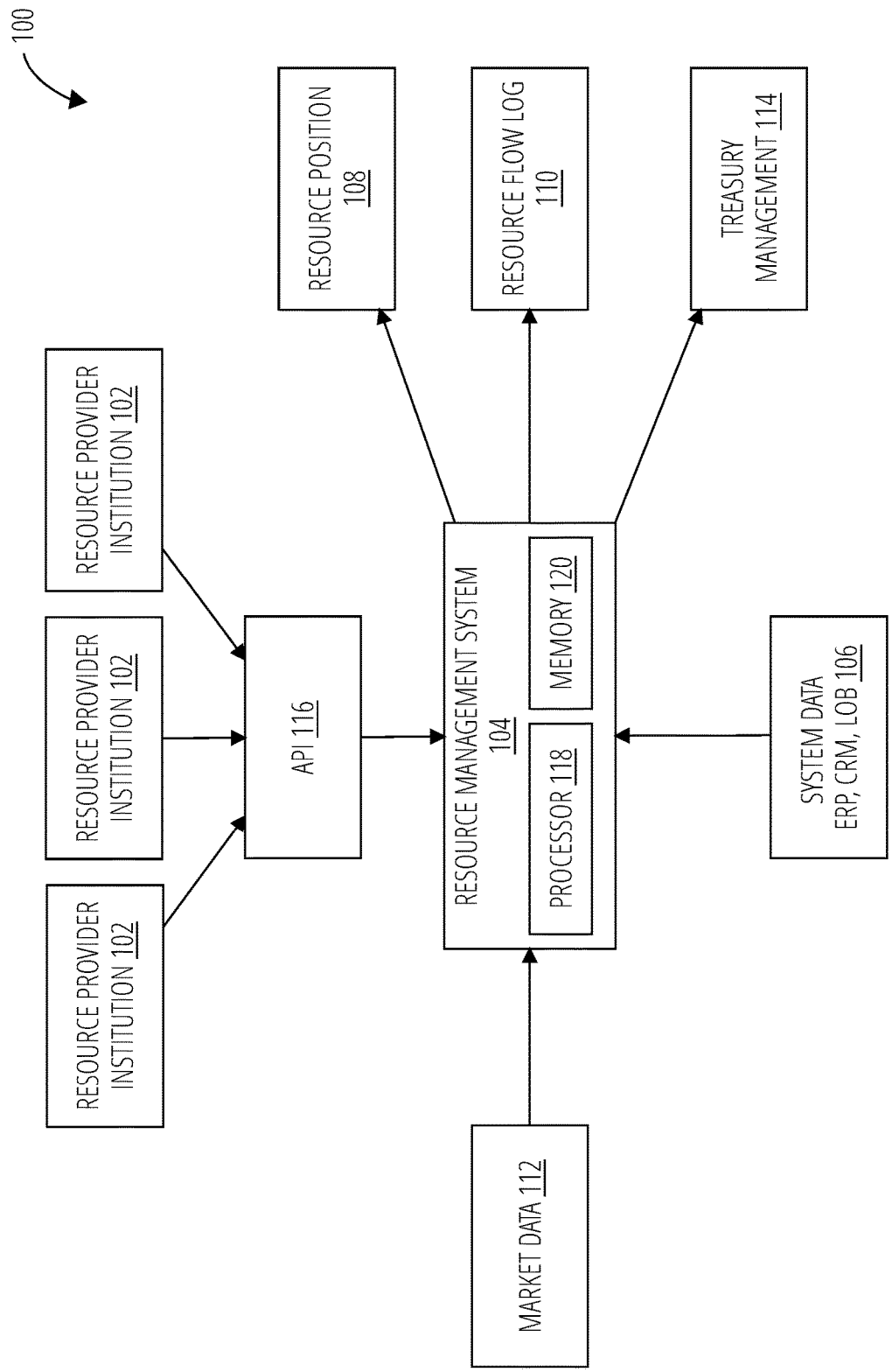
FIG. 1A depicts a resource co-operative system 100 in accordance with one embodiment.

Embodiments of a resource pooling system are described to pool and manage resources for companies to meet their operational goals. The resource pooling system may maintain in, or near, real time, a balance of resources among accounts. The system may provide resource positioning and resource forecasting.

The resource pooling system may continuously balance resources between a company's accounts to achieve a stable allocation for operational purposes. The resource pooling system may include a resource exchange to import needed resources and to export excess resources from third party resource provider institutions. The resource pooling system may function external to the resource provider institution's traditional process of qualifying, approving, and issuing resources or resource credit or debit settings. In one aspect, the resource pooling system may be operated in connection with a resource management system by a software-as-a-service ("SaaS") provider automating the process of transferring resources or resource credit or debit settings between the resource pooling system and its subscribers/clients.

A resource exchange, formed similar to a cooperative or co-op, may provide the resource pool for the benefit of its members. Resources may flow between the resource exchange and the resource exchange's member companies as a means toward optimizing member's resources on hand, and improving resource allocation and utilization overall, in a more agile manner than provided by conventional systems.

In one aspect, the resource pooling system may be hosted in the cloud by a cloud provider such as Amazon Web Services, Microsoft Azure, or other cloud or infrastructure-as-a-service provider. In another aspect, the resource pooling system may utilize distributed ledger technology, such as blockchain. In another aspect, the resource pooling system may utilize web or mobile user interfaces. In another aspect, the resource pooling system may utilize systems of a resource provider institution partner.

The resource pooling system may provide clients with resources on-demand and may enable the borrowing, leasing, and/or investing of operational assets dynamically determined from current or near-term operational requirements.

Embodiments of a distributed computing platform are disclosed to implement aspects of resource pooling systems and to automate operational tasks across functional areas within an enterprise. The platform implements a scalable online system for data ingest, indexing, and outflow, with performance-enhancing rate matching between stages.

The system may be configured with named hierarchical filters. As new transactions occur, indexing may be applied across a decoupling boundary, and hierarchical filters (called 'tags') may be applied post-index for enhanced performance and customization without necessitating the instrumentation of each transaction. Conventional indexing approaches write fields (e.g., tags) into each transaction that matches a condition. Adding fields into each transaction degrades performance as edits or changes to the tag or any aspect of the parameters utilized by the tag compels the system to scan through the entirety of the index and make changes to each record utilizing the tag, and then re-index.

The disclosed system exhibits improved performance by de-coupling indexing from the parametric constraints of tagging and thus may better match indexing performance with a rate of data ingest and/or data outflow. The disclosed technique enabled faster searching and more effective storage of data than previous methods, and thus provide a specific improvement to the operation of distributed computing platforms, and improves their capabilities for rate-matching inflows to indexing. The disclosed systems provide increased flexibility, faster search times, and potentially reduced memory requirements for data storage.

Multilevel hierarchical tags may be configured so that a parent-child relationship is established through the application of iterative refinements. The indexing operates asynchronously from the data ingest across a decoupling boundary. When ingestion and normalization complete a push notification may be applied across the decoupling boundary to trigger operation the indexing module to update the search index based on anchor tags in relational tables of the normalized data set.

The system enables on-demand retrieval by client devices of highly customized information for use in analytics and reporting, based on recently and periodically acquired data sets from disparate computer server systems with improved performance and lower latency than is available with conventional approaches.

In one embodiment data objects are generated for statistical and competitive modeling at higher resolution than some conventional approaches. Tagged inputs may be structured as nodes such that tags inherit features from parents tags. Tags may be utilized in Boolean combination such that instead of merely narrowing search results, combination tags may map to a wider set of data while also ignoring overlapping results.

In some aspects, a distributed data communication and transformation system includes an ingest module operative on a first side of a de-coupling boundary, the ingest module including a web integration service. The system further includes a normalizing module, and an outflow module operative on a second side of the de-coupling boundary, the outflow module including an indexing module configured to transform outputs of the normalizing module into a search index, the indexing module operative asynchronously from the normalizing module and the web integration service across the de-coupling boundary, and an outflow engine dynamically configurable from the second side of the de-coupling boundary to filter outputs of the search index without signaling across the de-coupling boundary.

In other aspects, a distributed data communication and transformation system includes an ingest module operative on a first side of a de-coupling boundary, the indexing module comprising a hot connection module configured with cadence rules for a plurality of disparate computer server systems. The system further includes an outflow module operative on a second side of the de-coupling boundary, the outflow module including an indexing module operative asynchronously from operation of the ingest module across the de-coupling boundary to transform outputs of the hot connection module into a search index; and an outflow engine dynamically configurable from the second side of the de-coupling boundary to apply onto transaction records referenced in the index a hierarchical transaction grouping control structure configurable from a mobile application independently of a search query session, the hierarchical transaction grouping control structure comprising one or more inheritance tag relationships and one or more container tag relationships.

In other aspects, a method of operating a distributed computer system includes operating an ingest module on a first side of a de-coupling boundary to normalize outputs of a hot connection module, processing the normalized outputs with an indexing module operated asynchronously from the ingest module on a second side of the de-coupling boundary to generate a search index, and operating a mobile application to apply onto transaction records referenced in the search index a hierarchical transaction grouping control structure independently of search query sessions on the search index, the hierarchical transaction grouping control structure comprising one or more inheritance tag relationships and one or more container tag relationships.

The ingest module may push the outputs of the normalizing module across the de-coupling boundary. The hot connection module may be responsive to a plurality of metadata control settings for disparate computer server systems, the control settings implementing cadence rules for connection to and data transfer from the disparate computer server systems. The hot connection module may be configured to execute a connection cadence on each of the disparate computer server systems based on the cadence rules. The normalizing module may implement a plurality of data transformation algorithms to apply to output of the web integration service. The ingest module and the outflow module may be serverless.

Embodiments of a resource forecasting system are also disclosed. A problem with traditional resource forecasting is that by the time the forecast is generated, information utilized to generate the forecast is out of date which may result in inaccurate predictions or forecasts. A company's resource position is typically dynamic and constantly changing. The company continues to operate, and transactions occur daily that impact the resource position. Traditional forecasting often takes too long to gather the needed information to produce a reliable and concrete resource forecast. Identifying the relevant transactions to produce a resource forecast, and accurately accounting for and designating each transaction into appropriate categories and classes, may take days or weeks and a team of analysts, accountants, and experts. The disclosed systems may be utilized to generate a resource forecast in a more reliable, accurate, timely, and trustworthy fashion than conventional manual approaches.

In one aspect, a computer-based operating platform is provided to automate operational tasks across functional areas within the an enterprise. The platform may function as a resource data aggregation hub. In one aspect, the operating platform (a) acquires and aggregates proprietary and non-proprietary resource data from external and internal sources, including but not limited to resource provider institutions, business systems or spreadsheets (i.e., Salesforce.com, Workday, Excel, etc.), accounting systems (i.e., Netsuite, SAP, etc.), market data (i.e., foreign exchange rates, interest rates, world news & events, etc.), and user-generated content; (b) securely stores, manages, monitors, the data; (c) compiles, processes, connects, computes, and enriches the data; and (d) autonomously and/or semi-autonomously forecasts and projects resource positions and performance data and metrics.

The platform may interface with and acquire inputs from at least the following sources: (a) resource provider institutions; (b) Enterprise Resource Planning (ERP) and other business systems or applications that the enterprise depends on to operate; (c) external market data, such as foreign exchange rates or interest rates that may be acquired from third-party aggregators; (d) user-generated content, such as forecasting assumptions; and (e) external global market events. The platform may be connected with each of these data sources via one or more computer communication networks, and via any number of interfaces such as application programming interfaces (APIs). These connections may be configured to enable the platform to automatically "pull" in the relevant data from each of the data sources, or have the data sources automatically "push" the relevant data to the platform, or both. The relevant data may be determined and set by a user, or the platform may utilize machine learning algorithms to intelligently learn which data may be relevant for the platform's functionality. In one embodiment the platform aggregates inputs from these sources into a cloud-native platform, i.e., one or more server computers that are accessible by one or more client computers via a computer network, and securely stores, monitors, manages, and protects this data in the cloud on behalf of its customers.

The platform architecture may comprise a data lake that stores the data, in whichever format the source data provides it, or an amalgamation (for example, raw database data may be stored in CSV or JSON format). The storage format may be structured, unstructured or semi-structured data. The data lake may include a database formed in a computer storage or memory subsystem. The data lake maintains an ever-growing historical view of original resource data for any company. This corpus of data enables the platform to be continuously enhanced without necessarily requiring new data to be input.

In various embodiments, components of the system may be implemented as or interface with a web application, a mobile application, and/or a REST API.

FIG. 1A depicts a resource co-operative system 100 that may be configured to automate and coordinate the allocation of resources for operational tasks across functional areas within an enterprise. The resource co-operative system 100 includes a resource management system 104 with interfaces to resource provider institutions 102, market data 112, and system data 106, such as ERP, CRM, and Line of Business (LOB) data.

Resource provider institutions encompass a broad range of business operations including equipment providers, power providers, bandwidth, storage, communication, and computational resource providers, fuel providers, labor providers, leasing agents, banks, trust companies, insurance companies, brokerage firms, investment dealers, and the like.

The resource management system 104 provides a hub for resource data aggregation, and includes a machine-readable medium storing non-transitory instructions (volatile memory 120) that enables one or more computer processor 118 to execute algorithms to form associations between data elements to compute, analyze, and predict the impact of operations on resource levels. Outputs of the resource management system 104 include resource position 108, resource flow log 110 and treasury management 114. The resource co-operative system 100 may receive resource data over a network by way of an application program interface (API 116) from one or more of the resource provider institutions 102, an enterprise resource planning (ERP) system, and user-generated content.

Figure 1B:
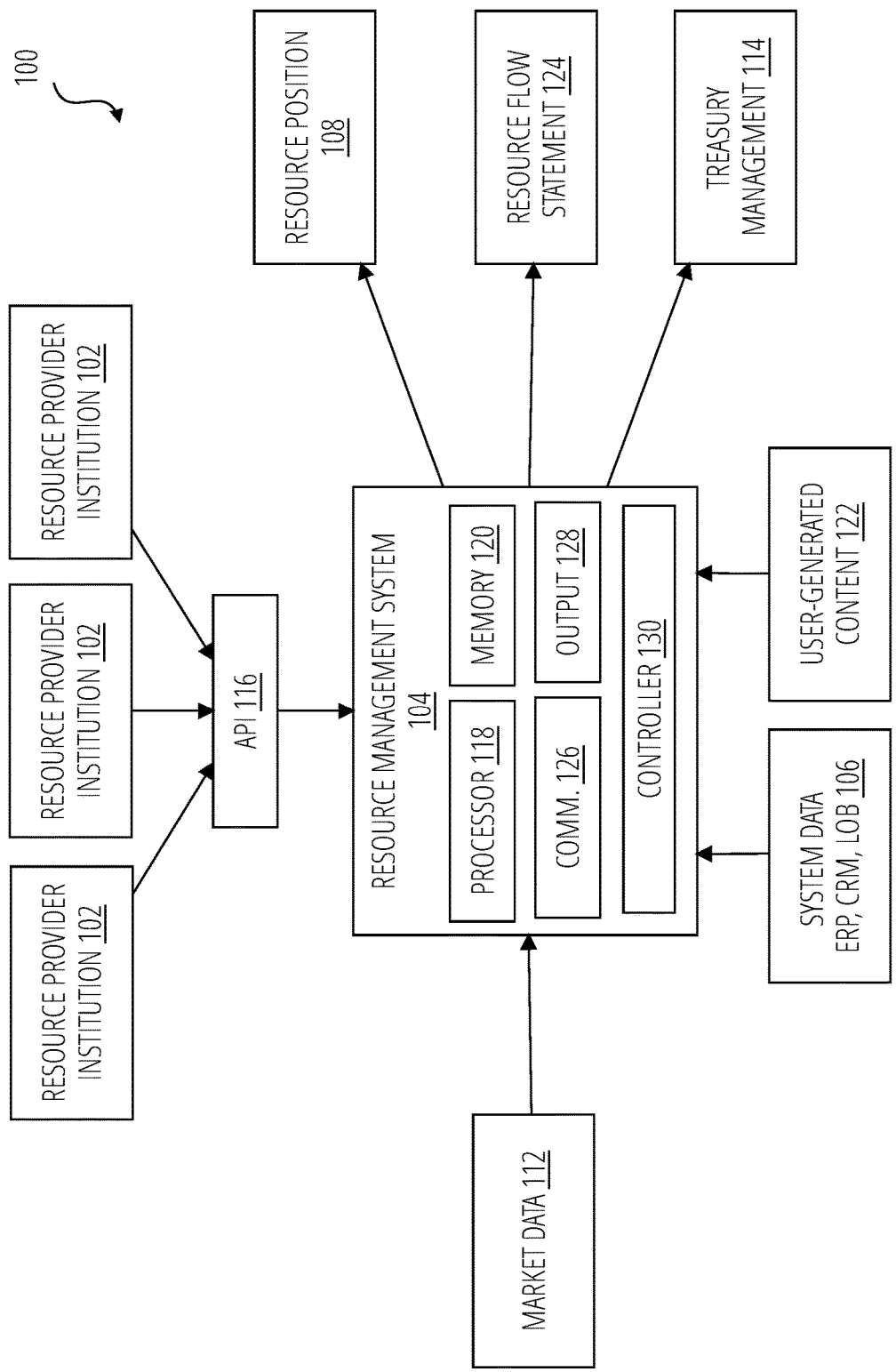
FIG. 1B depicts the resource co-operative system 100 in additional aspects.

FIG. 1B depicts additional aspects of the resource co-operative system 100 in one embodiment. A communication module 126 may access resource data over a network by way of the application programming interface (API 116) from one or more of a resource provider institutions 102 for each resource account of the company. The communication module 126 also receives user-generated content and inputs from an enterprise resource planning (ERP) system. The resource co-operative system 100 may include a controller 130 to coordinate the operation of the various components. For example the controller 130 may coordinate the various components to generate a resource position and/or resource forecast to the output module 128. The resource forecast may be provided in reports, and/or applied to other components to perform, for example, resource pool management.

In certain embodiments, a user of the resource co-operative system 100 may provide user-generated content 122 using one or more of the resource position 108, resource flow statement 124, and treasury management 114. In one or more embodiments, a single user or a team of users may generate user-generated content 122 using manual processes, automated processes, other business systems, or a combination of these. In one embodiment, user-generated content may include one or more resource forecasts built based on input, direction, advice, projections, plans, and goals provided by one or more persons. Certain embodiments may provide data and tools to enable the user to generate the user-generated content. For example, a user may reference a resource position, a resource flow statement, and/or treasury management information in generated reports to facilitate the production of resource forecasts.

In one embodiment, the user operates the resource co-operative system 100 to define and generate the user-generated content 122. For example, logic modules of the resource co-operative system 100 may interact with the user to enable the user to define one or more resource forecasts that may serve as user-generated content 122 for the resource co-operative system 100.

In one embodiment, the resource co-operative system 100 enables the user to access real time resource flow data in order to develop the user-generated content 122. Using current resource position 108 information a user may develop a resource forecast as, or as part of, the user-generated content 122. The user may generate the resource forecast based on known business decisions, the user's past experience, known business risks, and one or more outlooks for the company (e.g., optimistic, conservative, and/or pessimistic). In other embodiments the system generates the resource forecast.

Figure 2A:
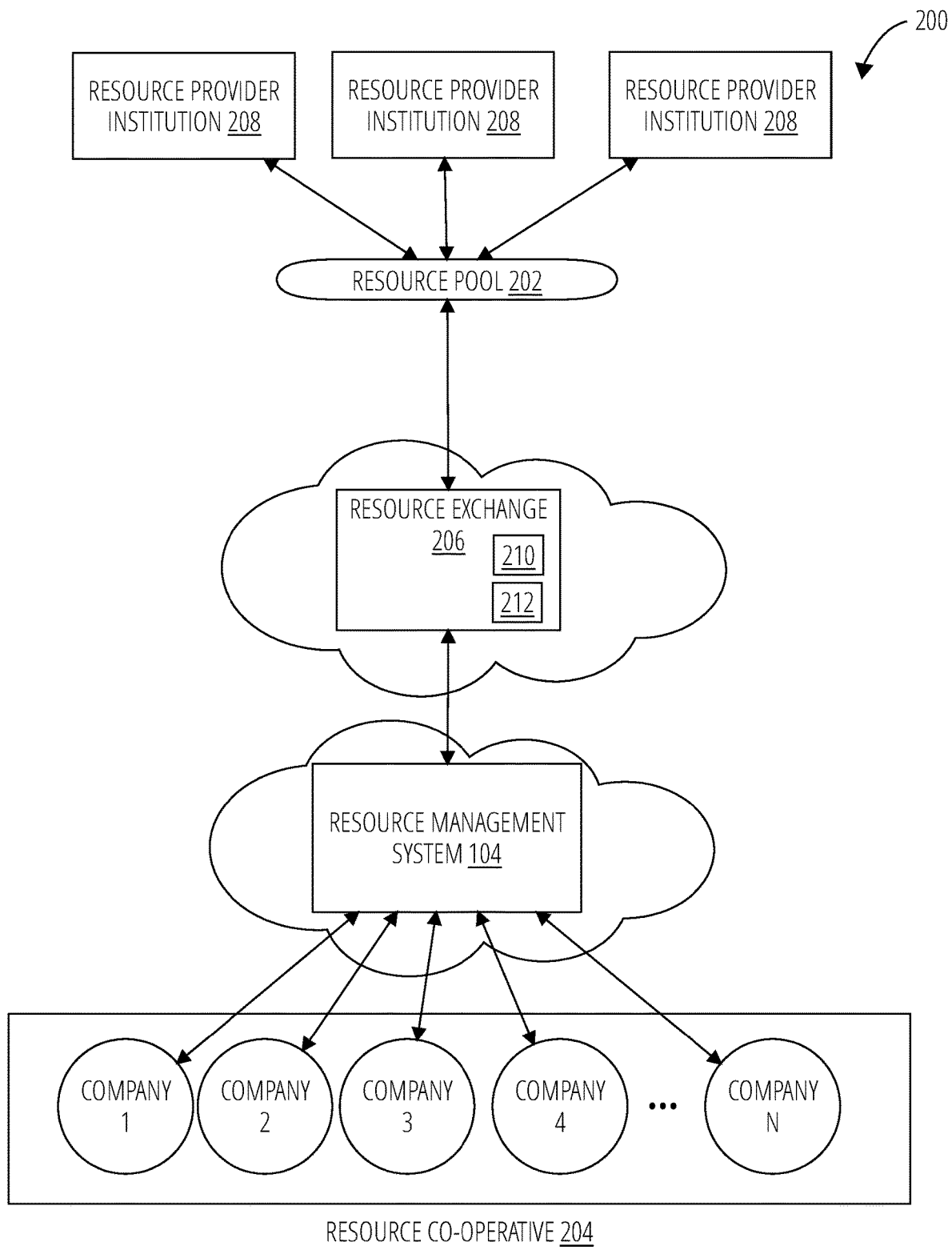
FIG. 2A depicts a resource pooling co-operative system 200 in accordance with one embodiment.

FIG. 2A depicts a resource pooling co-operative system 200 comprising a resource management system 104 enabling a resource co-operative 204 to utilize a resource exchange 206 on a resource pool 202. The resource exchange 206 comprises a resource forecaster 210 and a transaction manager 212.

The resource management system 104 is operatively coupled to a resource co-operative 204. A resource co-operative may comprise a plurality of member companies. The resource management system 104 is also operatively coupled to the resource exchange 206 which is operatively coupled to a resource pool 202. The resource pool 202 in turn is operatively coupled with resource provider institutions 208.

The resource management system 104 may be configured to determine a resource position for a member company within the resource co-operative 204. The resource forecaster 210 may be configured to determine one of a resource deficit needed for the member company for a future time period based on the resource position and excess resources above a threshold level of resources needed for the member company for the future time period. In one embodiment, the resource forecaster 210 may determine a resource deficit or excess resources by way of a resource forecast. The transaction manager 212 may be configured to generate a resource pool loan request in response to the resource forecaster 210 determining a resource deficit and to generate a resource deposit in response to the resource forecaster 210 determining excess resources. The resource exchange 206 may be configured to receive the resource deposits and extend a resource pool loan to the member company.

Figure 2B:
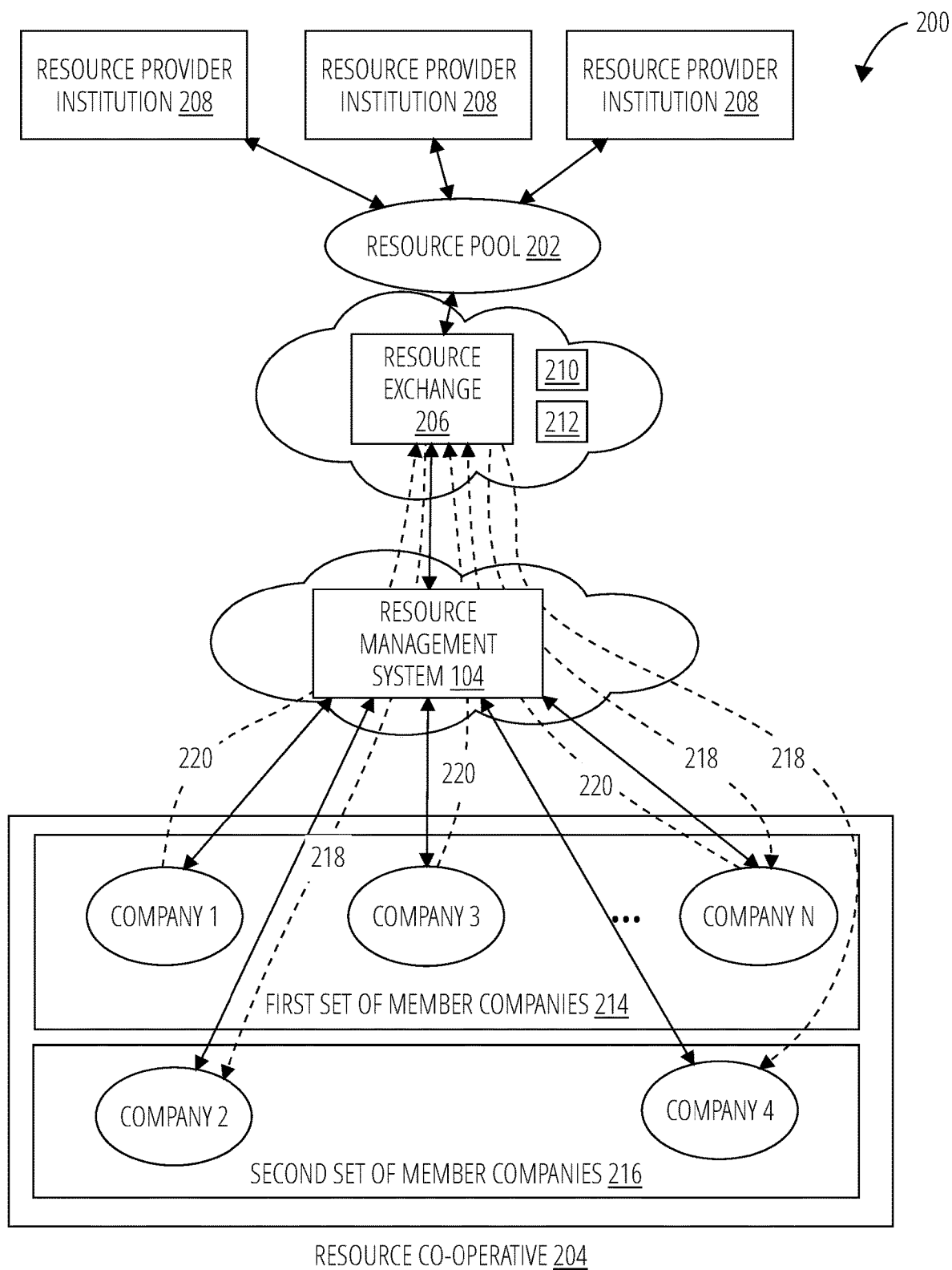
FIG. 2B depicts the resource pooling co-operative system 200 in additional aspects.

FIG. 2B depicts additional aspects of the resource pooling co-operative system 200 in one embodiment. The resource management system 104 is communicatively coupled to a first set of member companies 214 and a second set of member companies 216 of the resource co-operative 204.

The resource pooling co-operative system 200 may be operated to receive resource deposits 220 from a first set of member companies 214 into the resource pool 202, the resource deposits 220 comprising excess resources (or settings representing ownership or control of said resources) for operating the first set of member companies 214. If a company in the first set of member companies 214 or the second set of member companies 216 begins to run low on resources, the resource pooling co-operative system 200 may facilitate withdrawing resources from the resource pool 202 and transferring said resources to the company, so that the company has a sufficient amount of resources for anticipated operations. Alternatively, or in addition, the resource pooling co-operative system 200 may then lend resources from the resource pool 202 to a second set of member companies 216 as a resource pool loan 218 in response to each company of the second set of member companies 216 requesting resources in an amount that exceeds a total resource deposit for each particular company.

The resource pooling co-operative system 200 may determine the resource position for a company in the first set of member companies 214 and/or the second set of member companies 216 by way of the resource management system 104 for the company, and may determine risk associated with a resource loan to the company based on the resource position.

In some configurations, a resource lending process of the resource pooling co-operative system 200 may involve determining a credit profile for each company in a set of member companies and approving a resource pool loan 218 in response to the credit profile for each company (or the aggregate) of the set of member companies satisfying a threshold. This configuration may provide scores and/or ranks of member companies that are seeking loans from the resource pool and may utilize the score/rank to adjust the loan terms. This may be utilized to personalize loan agreements in situations in which the members of the resource pool are predetermined to be of the same credit worthiness.

For certain types of resources, the lending process of the resource pooling co-operative system 200 may involve assigning an interest rate or leasing rate for lending to each company of the set of member companies where the interest rate may be based on a credit profile for each company of the set of member companies, and/or on an aggregate credit profile for the set of member companies.

The resource management system 104 may automatically determine a timing and an amount for depositing excess resource deposits 220 of a company into the resource pool 202. The resource management system 104 may initiate the resource deposits 220 in response to one or more triggers. In certain embodiments, a trigger may be detection of an excess of resources on hand during a period of time where the outflow of resources is unlikely. For example, if the company completes several revenue projects that change the resource position of the company to an excess with no immediate expenses, the resource management system 104 may determine that the excess resources may be deposited from the company into the resource pool 202.

The resource management system 104 may also automatically determine a timing and an amount for a resource pool loan 218 from the resource pool 202 to a member company. The resource management system 104 may initiate a resource pool loan request to the resource pool 202 in response to one or more triggers. In certain embodiments, the resource management system 104 may determine, based on the resource flow forecast for a particular company, that the company may need additional resources to meet upcoming operations. In one scenario, the company may be awaiting a large inflow of resources that has taken longer to clear than expected, and thus in need of immediate resources to cover operational needs. In this scenario, the resource management system may determine that the expected inflow of resources would be sufficient to repay the resource pool loan 218 and automatically issue the resource pool loan 218 to the company to cover expected operational requirements.

Figure 2C:
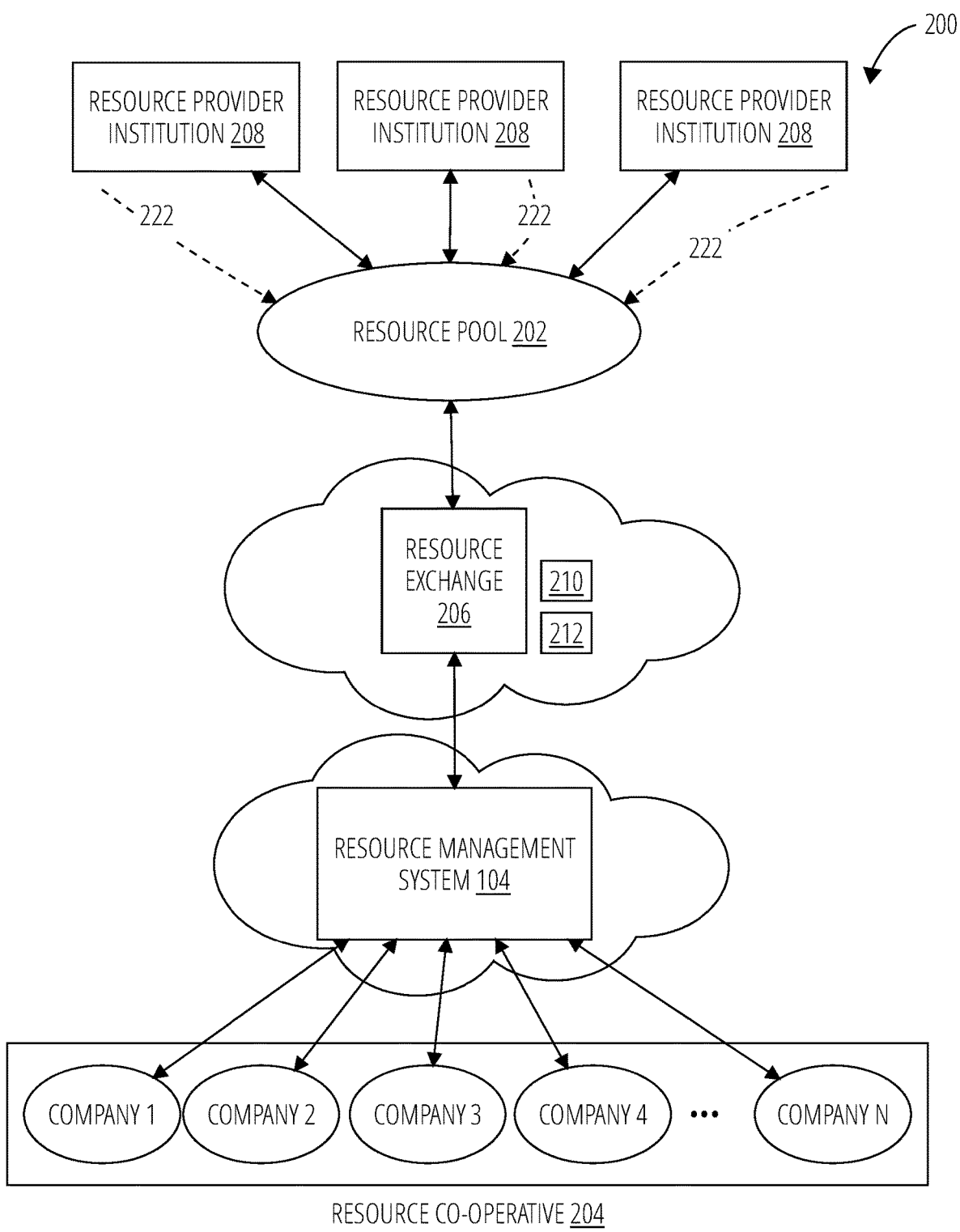
FIG. 2C depicts the resource pooling co-operative system 200 in additional aspects.

FIG. 2C depicts the contribution of resources 222 to the resource pool 202 by the resource provider institutions 208. The resource pooling co-operative system 200 may credit each account of a member company of the resource co-operative 204 having a positive balance with a pro rata share of an interest payment or leasing payment from one or more members of the resource co-operative 204.

In some configurations, the resource pooling co-operative system 200 may maintain the resource pool 202 at a predetermined amount by lending resources 222 from the resource provider institutions 208 to the resource pool 202 in response to reaching a predefined resource position level in the resource pool 202.

Figure 3:
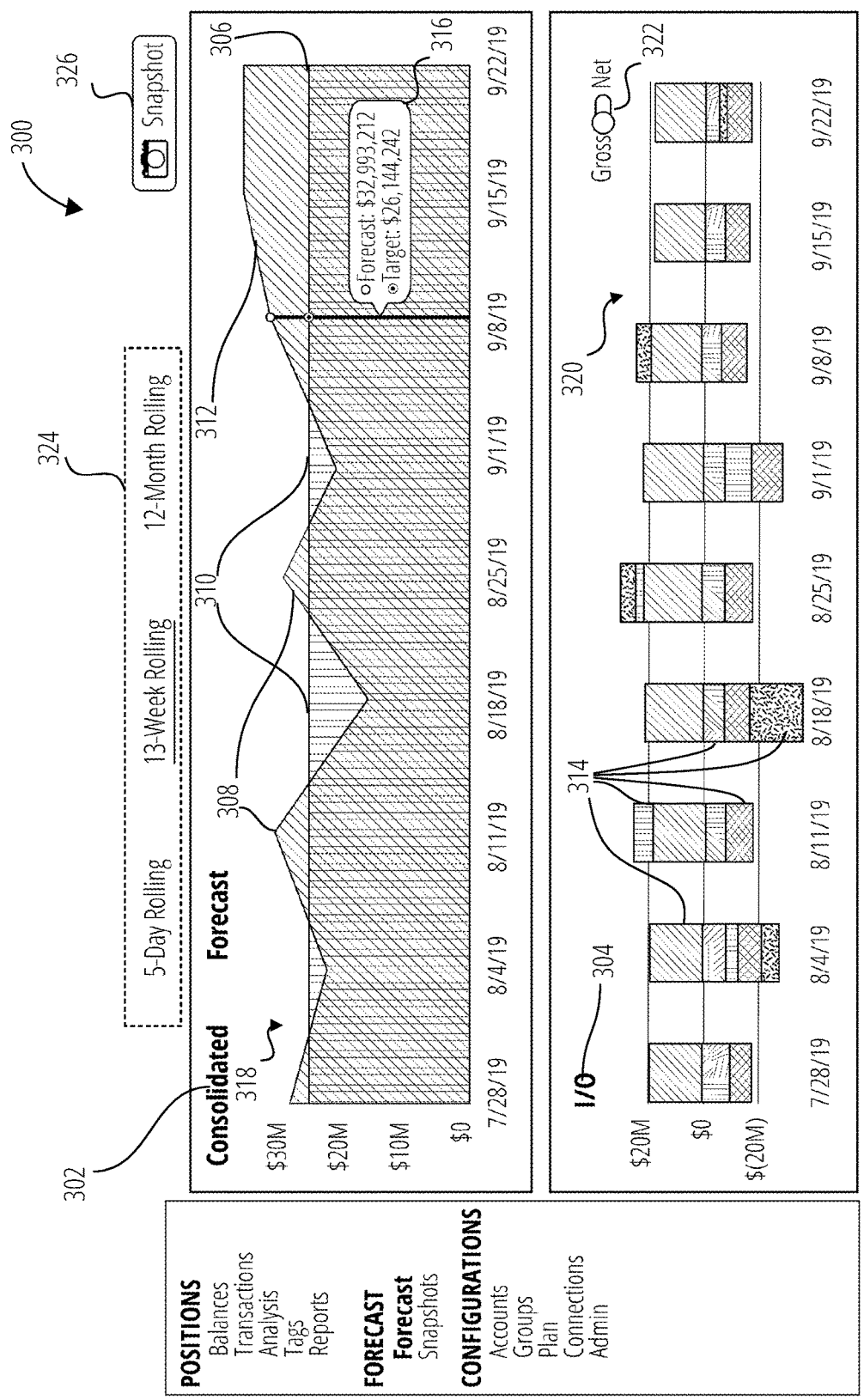
FIG. 3 depicts a user interface 300 in accordance with one embodiment.

Referencing FIG. 3, a user interface 300 depicts company's projected resource balance 302 and inflows and outflows 304 for various resource categories 314 in a graphical layout. The company's projected resource balance 302 includes a chart 318 depicting optimal level of resource to be maintained 306, shortfalls 310, and when there is resource in excess 308. The optimal level of resource to be maintained 306, indicated by the horizontal line, may be determined from the company's projected resource balance 302 utilizing the resource in excess 308 and shortfalls 310.

In this example, during some weeks, the company may have resource in excess 308 for funding operations—for example paying its suppliers or meeting payroll obligations to its employees. In another scenario, resource in excess 308 may be due to the company collecting more from customers for the products it sells in those weeks than anticipated. During other weeks, the company may have shortfalls 310 and may need more resources than what it has on hand to fund operations.

In a later scenario 312, the company continues to sell more products than forecast, and pays out less to its suppliers, and thus maintaining a consistent level of positive resource flow in excess of its operating levels. These resources are candidates to be loaned/leased out as investments.

The chart 318 comprises an indicator 316 that identifies the forecasted value and the target value of resources for a particular date. The inflows and outflows 304 comprise a graph 320 showing resource categories 314 as bar graphs delimited by a line indicating whether a resource category is in the inflow or outflow for a particular date. The inflows and outflows 304 may be switched between a gross or net view based through the use of a selector 322.

The company's projected resource balance 302 and the inflows and outflows 304 may be viewed in context with a time range selector 324. The time range selector 324 comprises viewing ranges from a five day rolling forecast, a thirteen week rolling forecast, and a twelve month rolling forecast. These forecast selections change the view of the company's projected resource balance 302 and the inflows and outflows 304 display different values for the selected interval. The user interface 300 may also include a snapshot button 326 enabling a user to take save a forecast for the company's projected resource balance 302 and the inflows and outflows 304 for later viewing.

FIG. 4 depicts a user interface 400 comprising a resource pooling system's predefined set points for managing to certain targeted balance objectives on a per-account basis. Although the resource at issue in this example is a purchasing resource, the invention is not in any way limited or specific to financial resources. Other, non-limiting examples of resources that may be managed include computing resources (e.g., storage, processing, bandwidth), fuel, energy, water, gas, or other utility, inventory, labor capacity, and office space.

The user interface 400 depicts each bank account with an amount 402 representing a resource balance. If the actual amount falls below this amount for a configured time period, the resource exchange may draw resources from the resource pool to bring the account balance up to the targeted level amount 402. Conversely, if the account balance rises above this amount during the configured time period, the resource exchange may transfer the excess resources into the resource pool to reduce the account balance to the targeted level amount 402.

Figure 5:
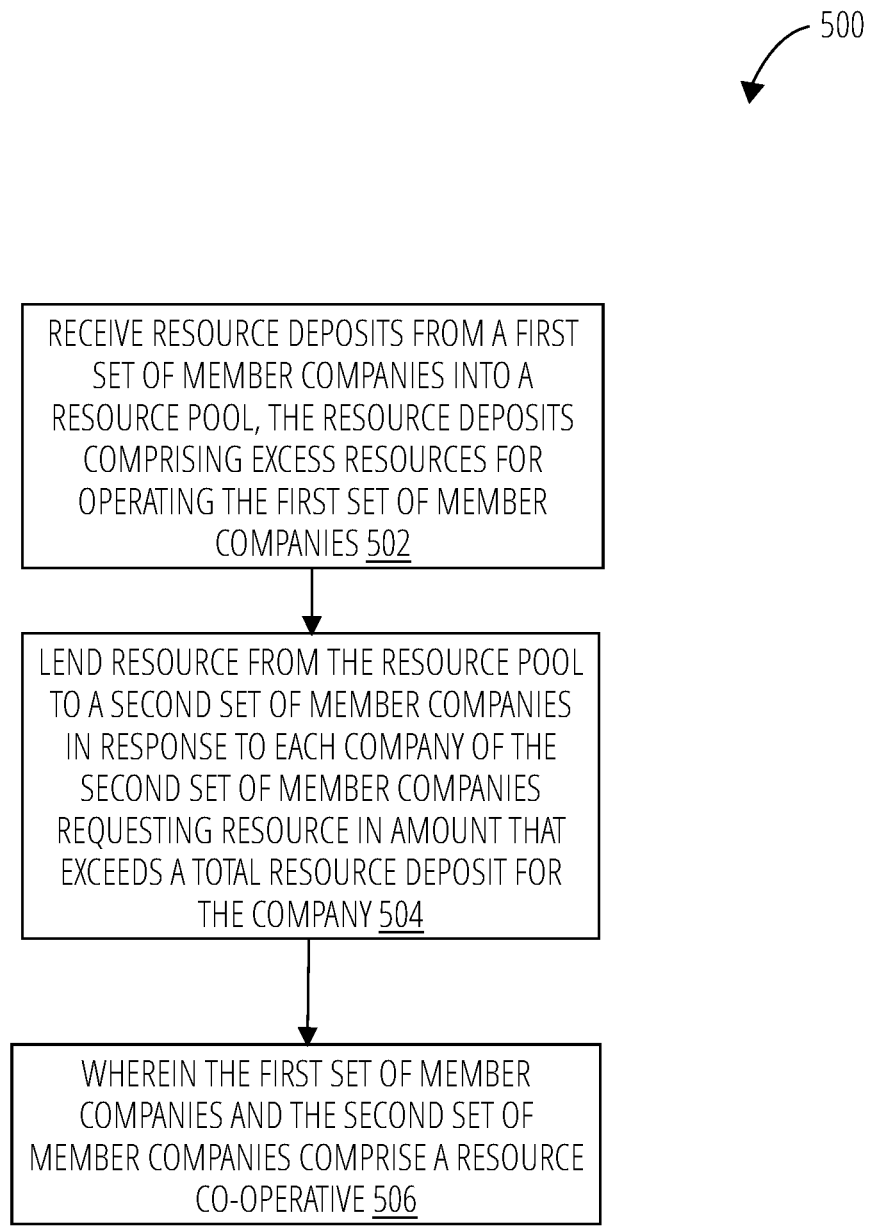
FIG. 5 depicts a process 500 in accordance with one embodiment.

Referencing FIG. 5, a process 500 for operating a system for pooling resources from member companies may involve receiving resource deposits from a first set of member companies into a resource pool, the resource deposits comprising excess resources for operating the first set of member companies (block 502). In block 504, process 500 lends resources from the resource pool to a second set of member companies in response to each company of the second set of member companies requesting resources in an amount that exceeds a total resource deposit for the company. In block 506, this effectively forms the first set of member companies and the second set of member companies into a resource co-operative.

Figure 6A:
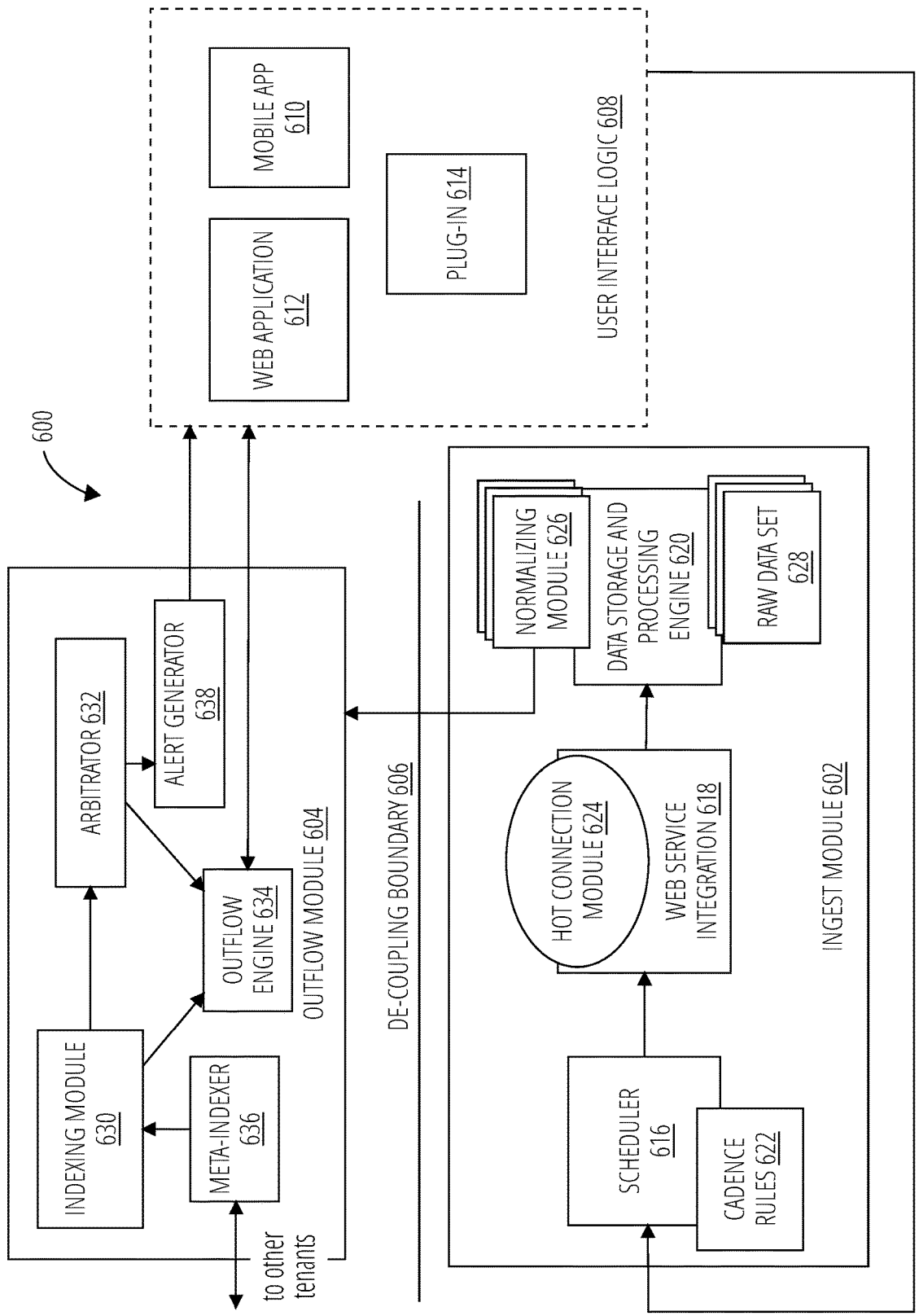
FIG. 6A depicts a distributed resource management computing platform 600 in accordance with one embodiment.

FIG. 6A depicts a distributed resource management computing platform 600 in one embodiment that may be utilized in a resource pooling system and/or resource forecaster (e.g., as the resource management system 104). At a high level, the distributed resource management computing platform 600 comprises an ingest module 602 and an outflow module 604 that interoperate across a de-coupling boundary 606. The ingest module 602 and outflow module 604 exchange data and control signals with user interface logic 608.

The ingest module 602 is operatively coupled to the user interface logic 608 and activates on a schedule to pull data from disparate computer server systems. The ingest module 602 is operatively coupled to the outflow module 604 and passes normalized data across the de-coupling boundary 606 to the outflow module 604. The outflow module 604 is communicatively coupled to the user interface logic 608 allowing a user to instrument a pipeline of normalized data from the ingest module 602 to the outflow module 604 and from there to the user interface logic 608 using hierarchical filter control settings, referred to herein as 'tags'.

The user interface logic 608 depicted here includes one or more of a mobile application 610, a web application 612, and a plug-in 614. The mobile application 610 and the web application 612 enable user interaction with and configuration of the distributed resource management computing platform 600. The plug-in 614 provides an interface between a restful logic component such as Excel and the distributed resource management computing platform 600.

The ingest module 602 comprises a scheduler 616, a web service integration 618, and a data storage and processing engine 620. The ingest module 602 is a serverless implementation that activates and deactivates services dynamically to ingest raw data from disparate computer server systems into a normalized format, according to individual schedules for each of the disparate computer server systems. Data ingest is controlled by a scheduler 616 and cadence rules 622. The scheduler 616 utilizes the cadence rules 622 to operate the web service integration 618, which opens connections and pulls data for further processing by the data storage and processing engine 620.

A hot connection module 624 manages the connections utilized by the web service integration 618 to pull data from the disparate computer server systems. The web service integration 618 invokes a dynamic application program interface (API) to each of the disparate computer server systems; each API may be specific to a particular server system and the connection via the API is controlled and maintained by the hot connection module 624.

The data storage and processing engine 620 operates a normalizing module 626 on a raw data set 628 received from the web service integration 618. This results in a normalized data set with consistent fields regardless of the specific format of the raw data sets from different ones of the disparate computer server systems. The normalizing module 626 utilizes a dynamically activated set of algorithms specific to the format of the data source. These algorithms perform functions such as file conversion, parsing, and analysis, and are well known in the art.

The connections established and maintained by the hot connection module 624 are "hot connections" that are opened and closed dynamically such that the connection is made persistent per rules established by institution-specific security protocols—OAuTH, tokenized, dual authentication etc. These rules may be configured in the hot connection module 624 or the scheduler 616 or both.

The scheduler 616 acts as a throttle/rate limiter based on a hierarchical prioritization of at least the following parameters (see FIG. 10):
1. institution restrictions on data access (connections or data amounts) per time interval
2. data availability or update schedules
3. user access privileges for the institution (what data are they allowed access to and how often)
4. institutional limits on data transfer amounts/rates per session Normalized data is communicated from the ingest module 602 to the outflow module 604 across the de-coupling boundary 606. The de-coupling boundary 606 is a computer resource utilization boundary separating the operation of the ingest module 602 and the outflow module 604. The de-coupling boundary 606 enables the ingest module 602 to operate independently and at a different rate from the outflow module 604; particularly the indexing module 630 of the outflow module 604 may operate asynchronously from the ingest and normalization of data by the ingest module 602.

Figure 6B:
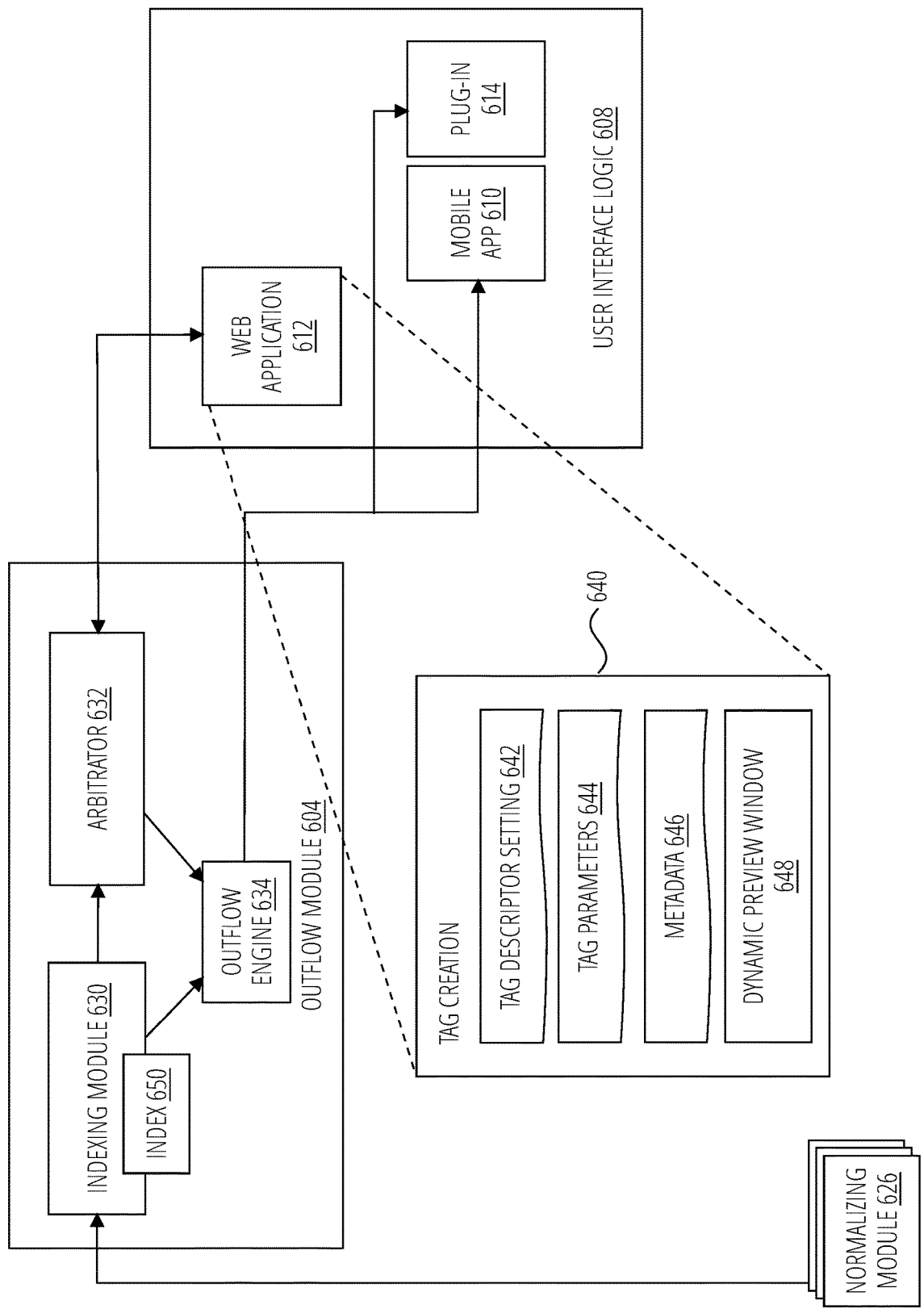
FIG. 6B depicts the distributed resource management computing platform 600 in additional aspects.

The outflow module 604 comprises an arbitrator 632, an indexing module 630, and an outflow engine 634. The outflow module 604 is a serverless implementation for data delivery for which services are activated and deactivated dynamically per client. The indexing module 630 is operatively coupled to the arbitrator 632 which manages contention for the outflow engine 634 among the various clients requesting data via the user interface logic 608. The arbitrator 632 also controls the operation of the outflow engine 634 based on hierarchical filters configured via the web application 612, as depicted in FIG. 6B.

The user interface logic 608 may be operated to configure the indexing module 630 with multiple tags to configure a multi-level control structure. During a session that occurs as part of a query or keyword search, the query is input to the outflow module and applied to the indexing module 630 as a setting. Settings on the app 2202 operate such that when a new batch of data is received across the de-coupling boundary 606 during the session the new batch of data is binned according to the settings determined by the query. Because this takes place in the context of a query session, it functions as a sticky setting that affects future normalized data that comes across the de-coupling boundary 606 to the indexing module 630.

Index settings may be implemented as tags that transform the identified transaction data. The indexing module 630 receives normalized transaction data from the ingest module 602 and transforms the normalized data through the application of the tags that label the transaction data associated with the query. This process may be performed asynchronously from the operation of the outflow module 604.

The tags are utilized to build a query structure for refining and/or enhancing the set of returned transaction data in response to a query. The tags implement a nodal structure for transaction data by combining tagged data into data sets. When tags are combined any duplicate entries are identified to avoid collision (double counting). A combination of tags may be applied to form sets of transaction data meeting complex criteria. The ingest module 602 is enabled to process new batches of transaction data to remove duplicates transactions that overlap with previous tags.

The user interface logic 608 may enable the application of exclusion tags that embody settings for the exclusion of data sets from results of multiple queries. For example, there may be parent tag comprising a plurality of tags (e.g., 80 tags) that maps to a large set of transactions. In some instances, the data set matching these parent tags may return undesirable results (e.g., unrelated entries, etc.,) that may originate from a change in a data sources naming schema. Identifying and removing or modifying specific existing tags that give rise to the undesirable results may be complex computational task. Exclusion tags may be added to remove the unwanted entries without removing or modifying existing tags. The exclusion tags may be added in the same manner as other tags.

The meta-indexer 636 controls the indexing module 630 based on the activity of multiple tenants of the distributed resource management computing platform 600. In the distributed resource management computing platform 600, multiple tenants may share the same executions resources to perform their operations while keeping their data separate. A meta-indexer 636 may be implemented with access to the data from all the tenants utilizing the distributed resource management computing platform 600. The meta-indexer 636 may analyze the larger data set and identify structures within the larger data set that have common attributes. The meta-indexer 636 may form tags that target these structures and these tags may be presented as suggestions to the various tenants. In some configurations, the meta-indexer 636 may globally monitor the activities of the indexing module 630 from different tenants and identify tags that are applied. These tags may be suggested or automatically applied to data of the various other tenants.

In some configurations, the outflow module 604 may include an alert generator 638 for generating alerts to the user interface logic 608 based on sensitivity settings configured at locations of the indexing module 630's generated control structure(s). The alert generator 638 communicates with the arbitrator 632 which generates an alert notification that is communicated to the user interface logic 608 when the condition defined by the sensitivity settings are met. The tags may also include sensitivity settings that not only are activated during client runtime sessions, but that may also activate asynchronously outside of runtime sessions. These sensitivity settings generate alert notifications for the mobile application when certain values, events, combinations thereof, or other conditions of the index are detected.

For example, a tag is set up that identifies a large data set. Within this tag a condition or trigger may be configured to generate an alert if an entry or transaction is identified at indexing time as having a value that exceeds a threshold. As the indexing module 630 is running in real time on data flowing in from the ingest module 602 and building the control structure, the arbitrator 632 is reading is reading all the entries that are indexed. Upon detecting the conditions or triggers, the arbitrator 632 communicates to the alert generator 638 which sends an alert to the user interface logic 608. The alert generator 638 may be also configured to communicate to the alert as a push notification to the mobile application 610, plug-in 614, the web application 612, or combinations thereof.

Figure 10:
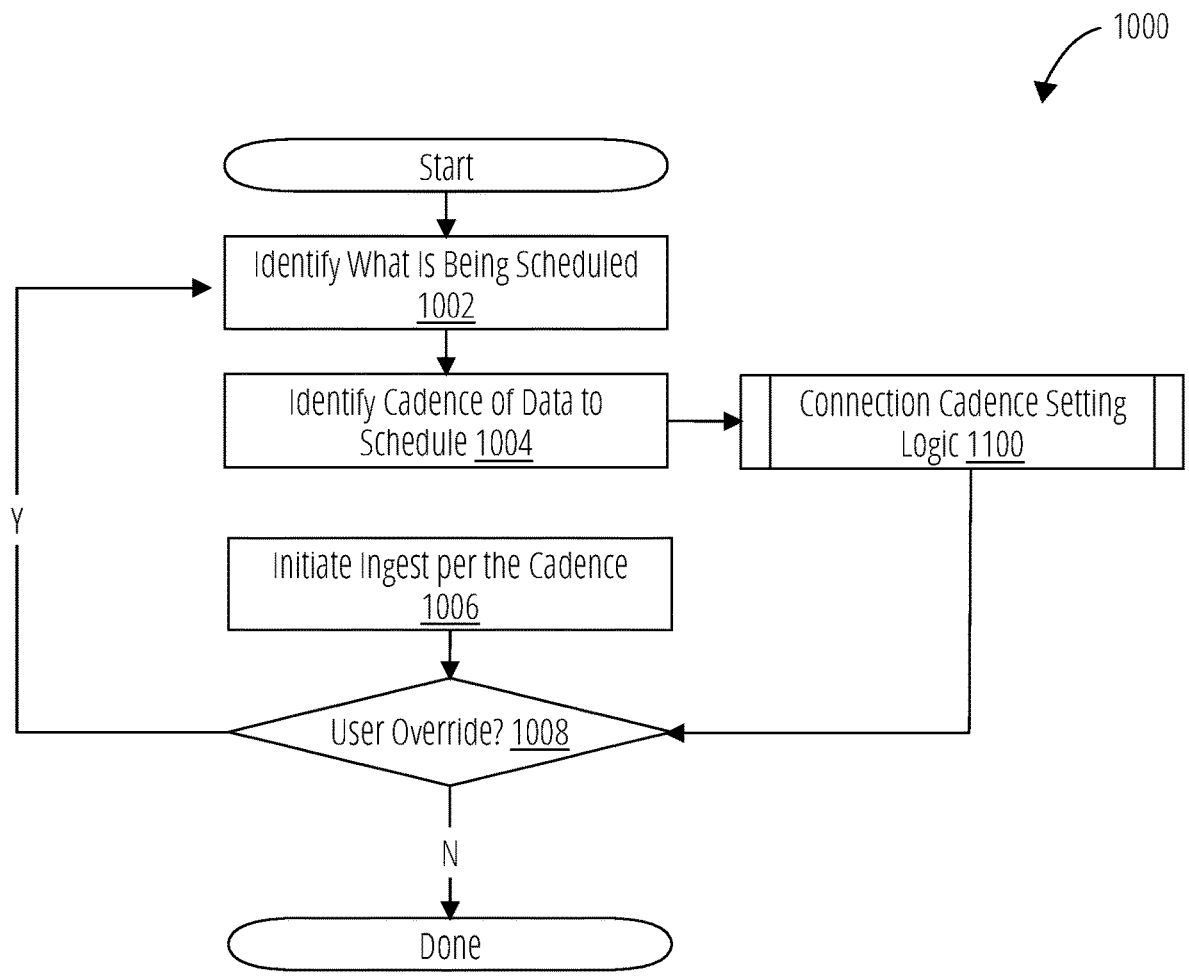
FIG. 10 depicts inter-system connection scheduler logic 1000 in accordance with one embodiment.
Figure 11:
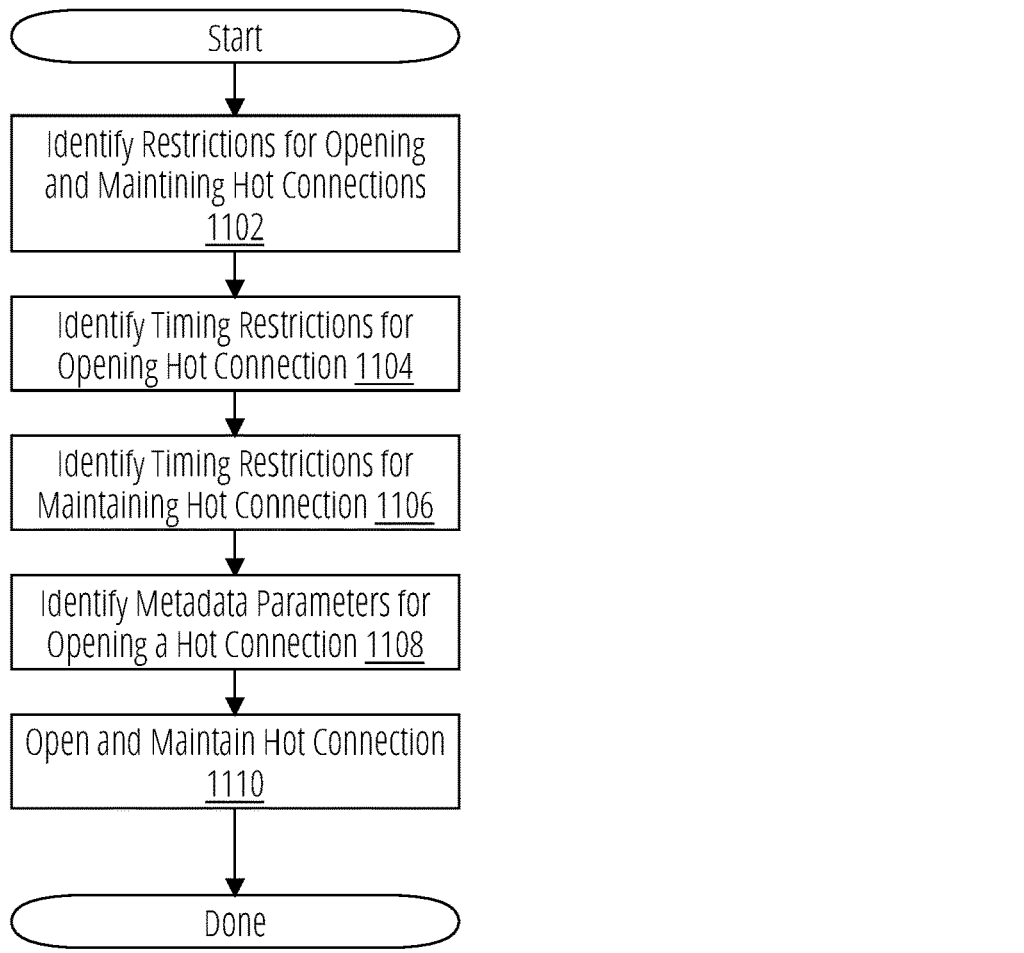
FIG. 11 depicts connection cadence setting logic 1100 in accordance with one embodiment.
Figure 12:
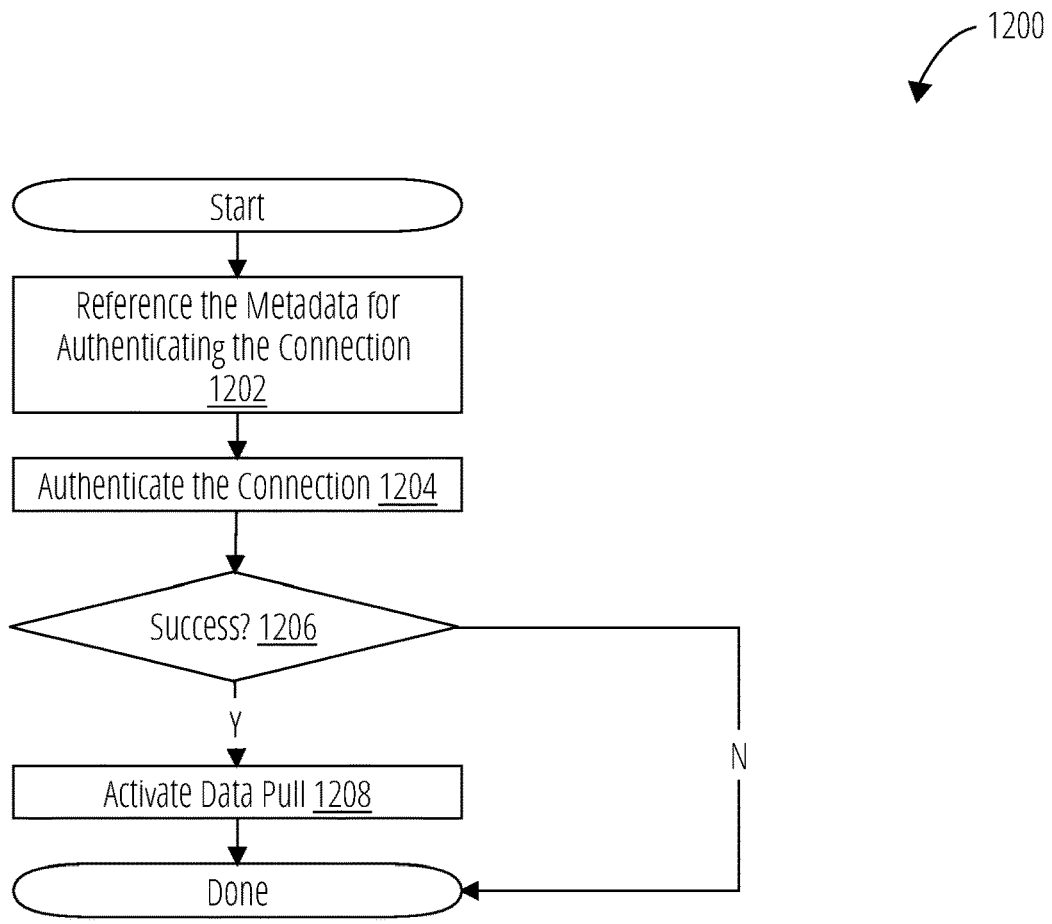
FIG. 12 depicts hot connection logic 1200 in accordance with one embodiment.

The distributed resource management computing platform 600 may, in one embodiment, operate according to the processes depicted in FIG. 10 through FIG. 12.

FIG. 6B depicts tagging logic 640 in one embodiment. The web application 612 is depicted in more detail and comprises tagging logic 640 that provides a tag descriptor setting 642, tag parameters 644, metadata 646, and a dynamic preview window 648.

The tagging logic 640 enables the configuration of tags comprising settings. The tag descriptor setting 642 is a label to concisely reference the tag for future use. The tag parameters 644 along with the metadata 646 form settings to apply to structure the normalized data generated by the ingest module. The metadata 646 may for example identify specific institutions, accounts, currencies, and/or transaction types. Other types of metadata 646 may also be selectable. The dynamic preview window 648 displays normalized data that would be associated with the tag as it is currently configured.

To form a hierarchical control structure, one or more tag descriptor setting 642 for existing tags may be set in the tag parameters 644. The tag parameters 644 may be generated in many ways, including explicit selections, automatically from search queries, and from natural language inputs. The tag parameters 644 may be applied as "fuzzy" parameters as that term is normally understood in the art. Some of the tag parameters 644, such as the institutions and accounts, may be "anchor" settings that associate with specific records in one or more database comprising the normalized transaction records.

The control structures based on tags are configurable from the mobile application 610 of end users, independently of a search query session between the mobile application 610 and the outflow module 604. Tag-based structuring may be applied to the transaction index 650 independently for each user and/or organization, rather than being a global property of the index 650.

Substantial performance improvements are realized by building the search index 650 based on relational tables in the normalized data set that includes fields for the anchor tag parameters 644, and then generating search results from the index 650 constrained by groupings defined by a hierarchical control structure comprising tag parameters 644 that are not anchored but instead implemented as controls applied to the transaction records in the index 650. The groupings are applied dynamically (as client requests are received). The control structure may for example implement white list and black list constraints on search engine results returned to the web application 612 by the outflow engine 634.

The indexing module 630 is asynchronously coupled to the normalizing module 626 to receive the normalized data across the de-coupling boundary 606. The web application 612 is communicatively coupled to the arbitrator 632 to configure the arbitrator 632 with one or more configured tag for the outflow engine 634 to apply to the index 650 generated by the indexing module 630. The outflow engine 634 is operatively coupled to communicate result sets thus generated to the mobile application 610 and/or the plug-in 614 (for example).

The distributed resource management computing platform 600 may in one embodiment operate according to the process depicted in FIG. 10 through FIG. 12.

FIG. 6C depicts a user application program interface 652 for tagging logic 640 in one embodiment. The user application program interface 652 comprises a tag descriptor setting 642, a dynamic preview window 648, a metadata 646, and a tag parameters 644. The tag descriptor setting 642 include the tag name and tag description fields. A user sets a label for the tag (e.g., "Payroll") and a tag description (e.g, "All payroll transactions") to help identify the tag later on. A user may also select the auto-tag option to continue automatic tagging of new transactions ingested into the system that match the tagging criteria.

Tags may also be configured by type. There are parameter based tags, and tag-based tags. Parameter based tags are tags created based on a set of tag parameters 644 such as query values (e.g., terms), date ranges and metadata 646 such as the transaction types, data source names, accounts, and currencies (e.g., USD, etc.,). Tag-based tags are combination tags to identify existing tags to be utilized in combination with a new tag. A tag-based tag may comprise Boolean or mathematical, or both, combinations of parameter-based tags and/or other tag-based tags.

With each configuration of the tag parameters 644, transactions within the dynamic preview window 648 are modified to reflect the change in parameters. When a user is satisfied with the results, they may save the created tag.

Figure 7:
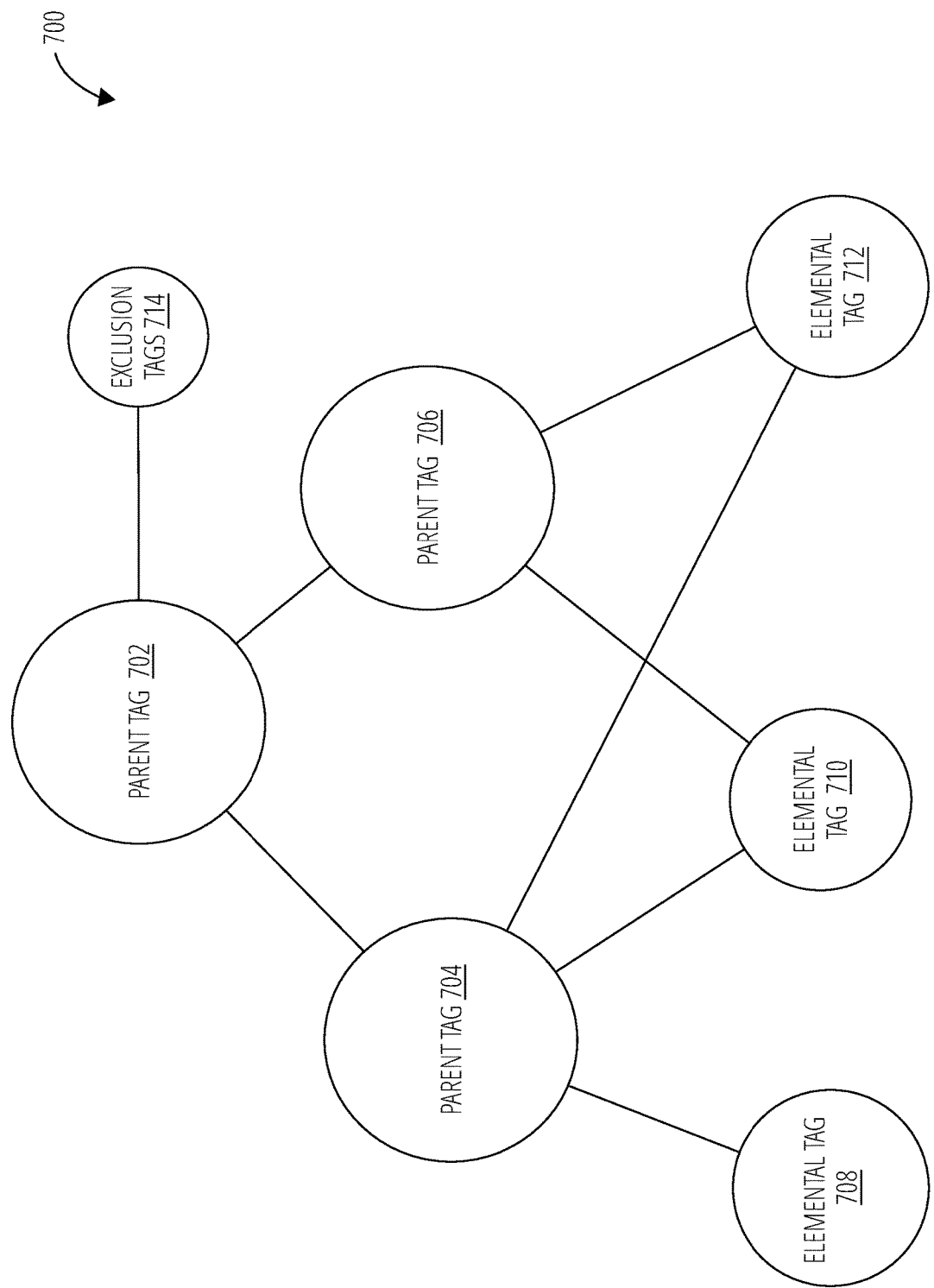
FIG. 7 depicts a tag-based control structure 700 to utilize in conjunction with the indexing module 630 in accordance with one embodiment.

FIG. 7 depicts a control structure 700 in one embodiment. The control structure 700 comprises a top-level parent tag 702 that inherits structure from a parent tag 704 and parent tag 706. These in turn inherit structure from elemental tag 708, elemental tag 710, and elemental tag 712. Exclusion tags 714 are applied in this example to the top-level parent tag 702.

Figure 8:
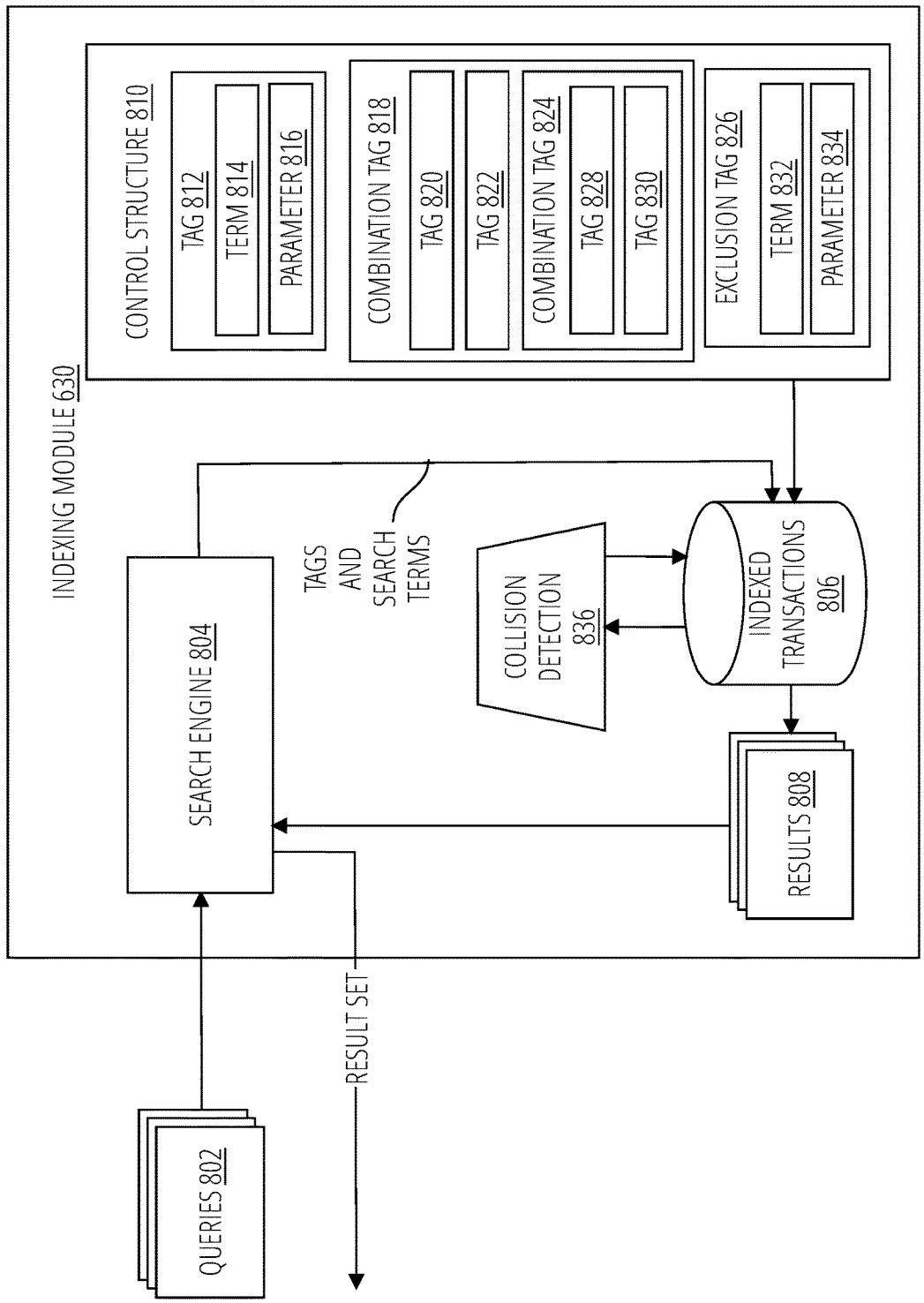
FIG. 8 depicts an embodiment of the indexing module 630 in additional aspects.

FIG. 8 depicts an indexing module 630 in one embodiment. Queries 802 are input to the search engine 804 and applied against a database of indexed transactions 806 to generate results 808 returned to the mobile application 610. The search engine 804 applies tags from the queries 802 and/or search terms from the queries 802 to the indexed transactions 806. The control structure 810 imposes a grouping structure within the indexed transactions 806 as transactions are received across the de-coupling boundary 606. This structure is traversed to match the tags and search terms from the queries 802. The control structure 810 is organized asynchronously from the queries 802 (e.g., using the web app) and rate matched to the operation of the ingest module 602.

When viewed in conjunction with FIG. 7, it may be appreciated that the control structure 810 may be structured hierarchically both in terms of inheritance (vertical and lateral i.e. parent-child or sibling-sibling inheritance) and container (nesting) relationships among tags.

The control structure 810 in this example comprises a hierarchical structure of tags. At the highest level are parameter tag 812 (comprising term 814 and parameter 816), combination tag 818 (comprising parameter tag 820, parameter tag 822, and combination tag 824), and exclusion tag 826. The combination tag 824 of the combination tag 818 comprises parameter tag 828 and parameter tag 830. The exclusion tag 826 comprises term 832 and parameter 834. The control structure 810 demonstrates the richness of possible grouping structures that may be imposed on the indexed transactions 806. Collision detection 836 is performed on the groupings to remove duplicates from the grouping structures of the indexed transactions 806.

The decoupling of transaction indexing from ingest, of transaction indexing from formation of the control structure 810 imposed on the indexed transactions 806, and of both indexing and formation of the control structure 810 from runtime filtering, may substantially improve both performance of the search engine 804 and the flexibility and richness of the results 808 generated in response to the queries 802.

Figure 9:
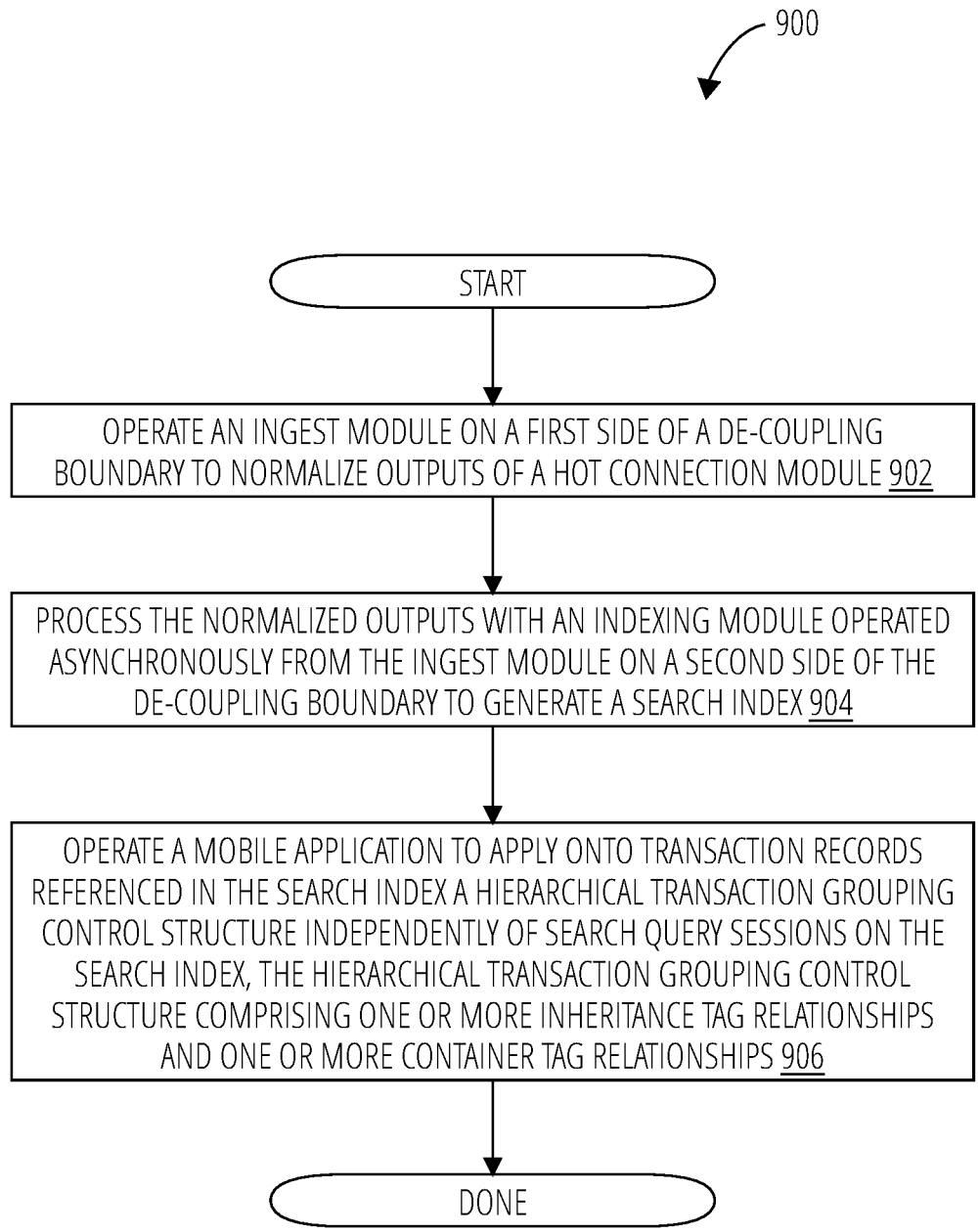
FIG. 9 depicts a computer system routine 900 in accordance with one embodiment.

FIG. 9 depicts a computer system routine 900 in one embodiment. In block 902, the computer system routine 900 operates an ingest module on a first side of a de-coupling boundary to normalize outputs of a hot connection module. In block 904, the computer system routine 900 processes the normalized outputs with an indexing module operated asynchronously from the ingest module on a second side of the de-coupling boundary to generate a search index. In block 906, the computer system routine 900 operates a mobile application to apply onto transaction records referenced in the search index a hierarchical transaction grouping control structure independently of search query sessions on the search index, the hierarchical transaction grouping control structure comprising one or more inheritance tag relationships and one or more container tag relationships.

FIG. 10 depicts an inter-system connection scheduler logic 1000 in one embodiment. The inter-system connection scheduler logic 1000 may be implemented for example in the scheduler 616. The actions depicted should not be presumed to occur in the order presented, unless an action depends on the result of a previous action to be carried out. If two or more actions are not conditioned on one another in some way, one skilled in the art will readily ascertain that they may be carried out in parallel, in a time-division fashion, or in a different order.

At block 1002, the inter-system connection scheduler logic 1000 identifies which data sources are being scheduled. This action may be carried out for example by the scheduler 616 by way of the user interface logic 608. This action may result in the identification of data to pull and from which of the disparate computer server systems that act as data sources.

At block 1004, the inter-system connection scheduler logic 1000 identifies the cadence of the scheduled data. This action may be carried out by the scheduler 616 and may be embodied in the cadence rules 622. This action may result in invocation of a connection cadence setting logic 1100 as depicted in more detail in FIG. 11.

At block 1006, the inter-system connection scheduler logic 1000 initiates ingest of data as per the cadence rules 622. This action may be carried out by the web service integration 618 by way of the hot connection module 624. This action may result in data being pulled and stored from various banking of the disparate computer server systems through dynamic API connections managed by the hot connection module 624 according the scheduler 616 and the cadence rules 622.

At decision block 1008, the inter-system connection scheduler logic 1000 carries out a determination for the presences of a user override received from the connection cadence setting logic 1100. This test may be carried out by the scheduler 616 and the cadence rules 622. This determination results in identification of a user override or the absence of the user override. If a user override is detected, the inter-system connection scheduler logic 1000 returns to the block 1002 where the inter-system connection scheduler logic 1000 beings again by identifying the data to schedule. If a user override is not detected the process terminates. A user override may originate from a number of sources such as a system operator of the distributed resource management computing platform 600, or a user of client logic such as the user interface logic 608.

FIG. 11 depicts connection cadence setting logic 1100 in one embodiment. The connection cadence setting logic 1100 may be operated to set cadence for pulling data from disparate computer server systems in accordance with their access and security protocols. The actions depicted should not be presumed to occur in the order presented, unless an action depends on the result of a previous action to be carried out. If two or more actions are not conditioned on one another in some way, one skilled in the art will readily ascertain that they may be carried out in parallel, in a time-division fashion, or in a different order.

At block 1102, the connection cadence setting logic 1100 identifies availability restrictions for establishing the hot connections. This action may be carried out in accordance with the cadence rules 622 by hot connection module 624. This action results in the identification of data access availability.

At block 1104, the connection cadence setting logic 1100 identifies timing restrictions for opening hot connections and again is implemented by the hot connection module 624 in accordance with the cadence rules 622. This action results in the identification of timing restrictions such as required intervals between connections or permissible or blackout connection times for institution-specific security protocols—OATH, tokenized, dual authentication etc.

At block 1106, the connection cadence setting logic 1100 identifies timing restrictions for maintaining hot connections and again is implemented by the hot connection module 624 in accordance with the cadence rules 622. This action results in the identification of timing restrictions such as timeout intervals and restrictions on connection duration for institution-specific security protocols—OAuTH, tokenized, dual authentication etc.

At block 1108, the connection cadence setting logic 1100 (e.g., the hot connection module 624) identifies metadata parameters for opening and establishing a hot connection. This action results in the identification of connection protocol and API-specific parameters, including authentication and authorization parameters, for opening and maintaining a hot connection.

Following block 1108, the connection cadence setting logic 1100 moves to block 1110 where the connection is established and maintained by the hot connection module 624 and scheduled data pulls are made from the disparate computer server systems.

FIG. 12 depicts hot connection logic 1200 in one embodiment. The hot connection logic 1200 establishes and maintains hot connections with external disparate computer server systems. The actions depicted should not be presumed to occur in the order presented, unless an action depends on the result of a previous action to be carried out. If two or more actions are not conditioned on one another in some way, one skilled in the art will readily ascertain that they may be carried out in parallel, in a time-division fashion, or in a different order.

At block 1202, the hot connection logic 1200 references the connection type and API metadata to begin authentication and authorization with one of the disparate computer server systems. This action and subsequent ones of the hot connection logic 1200 would typically be carried out by the hot connection module 624 in accordance with the cadence rules 622. At block 1204, the hot connection logic 1200 utilizes the metadata to authenticate/authorize and establish a connection with the external system.

At decision block 1206, the hot connection logic 1200 determines whether the connection was successfully established. If the determination identifies that the connection was successful, the hot connection logic 1200 moves to block 1208 where the data pull is activated. If the connection was not successful, the process either terminates or retries the establishment of the connection.

Figure 13:
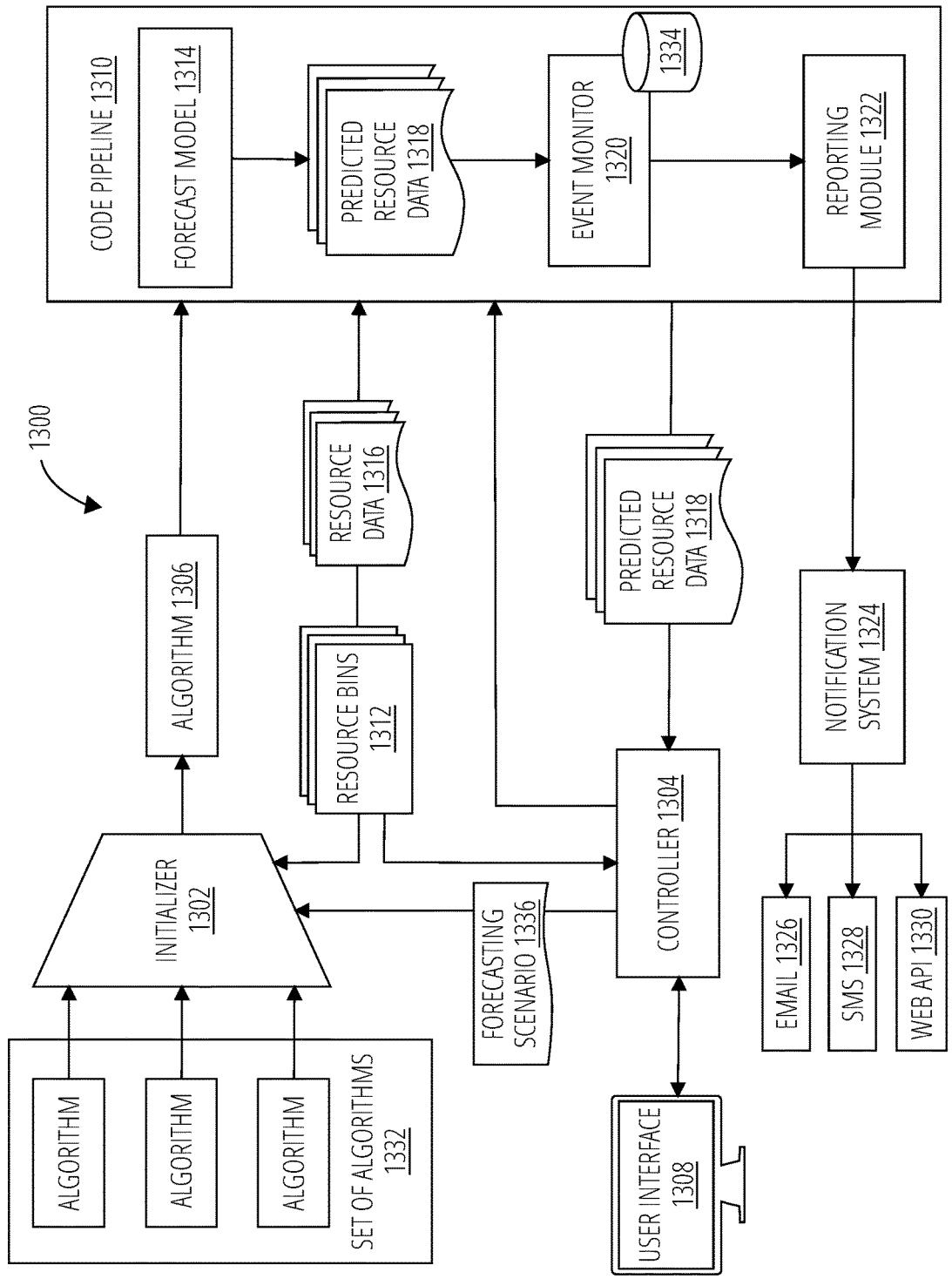
FIG. 13 depicts a resource forecast module 1300 in accordance with one embodiment.

FIG. 13 depicts a resource forecast module 1300 in one embodiment. The resource forecast module 1300 comprises a user interface 1308, a controller 1304, an initializer 1302, a code pipeline 1310, and a notification system 1324. A user communicates a forecasting scenario 1336 for a particular resource bin of the resource bins 1312 for a specified time range. The forecasting scenario 1336 and time range are applied to the initializer 1302, which selects an algorithm 1306 from a set of algorithms 1332 to generate a forecast model 1314 for the resource bin during the time range. The selected algorithm 1306 is executed in a code pipeline 1310 to generate the forecast model 1314.

The algorithms may comprise any demand and/or flow modeling algorithm known the art for modeling resource inflow and outflow behavior in an organization. The selected algorithm will depend on the nature of the resource to model and the scenario. For example there exist many financial modeling algorithms that may be selected based on the provided forecasting scenario 1336. Likewise there exist many modeling algorithms for bandwidth consumption, computing power consumption, energy consumption, water consumption, equipment requirements to meet operational goals, and so on. These algorithms may be parameterized in manners known in the art. To select the algorithm 1306, the initializer 1302 may perform a best fit between attributes of the forecasting scenario 1336 and parameters of each algorithm in the set of algorithms 1332.

The forecast model 1314 utilizes the resource data 1316 from the resource bins 1312 to generate predicted resource data 1318 for the selected one of the resource bins 1312 for the future time range. The predicted resource data 1318 is provided to the controller 1304 which communicates the predicted resource data 1318 to the user interface 1308. The predicted resource data 1318 is also utilized by an event monitor 1320 in the code pipeline 1310 that compares the predicted resource data 1318 to triggers in a trigger database 1334. The triggers are values and conditions (e.g., changes in values over time, etc.,), and combinations thereof configured in the system and associated with an alert. When the event monitor 1320 detects a trigger in the predicted resource data 1318, an alert is generated and communicated to a reporting module 1322. The reporting module 1322 communicates the alert to the notification system 1324 which distributes the alert to one or more of a plurality of notification routes comprising, for example, email 1326, SMS 1328, and a Web API 1330.

In some configurations, the algorithms in the set of algorithms 1332 may be determined based on the characteristics of the forecasting scenario 1336. For example, characteristics of the resource data in the resource bins 1312 such as the data type, data range, time of the year that the scenario is being generated, etc., may be utilized in selecting a set of algorithms 1332 for the initializer 1302. The characteristics of the future time range may also be utilized to determine the set of algorithms 1332. For example, the future time range may be set to generate predictions in six weeks, three months, six months, or twelve months in the future. This future time range may be utilized by the initializer 1302 in determining the initial set of algorithms and/or selecting the algorithm 1306.

In some configurations, the selection process utilized by the initializer 1302 may determine an algorithm from the set of algorithms 1332 utilizing a competitive technique, by comparing models generated by the set of algorithms 1332 to resource data from the resource bins. The initializer 1302 may take historical resource data or generate synthetic historical resource data and generate forecast models for each of the algorithms. The historical resource data may be selected based on similarities to the forecasting scenario 1336 such that the size of the resource data and size of the future time range are similar, where the future time range is utilized to determine actual resource data values. The synthetic historical resource data may be generated with similarities to the forecasting scenario 1336, such as similarities in the size of the resource data and the future time range. The initializer 1302 may then compare predicted resource data generated from the forecast models to actual resource data values found in the resource bins 1312. The initializer 1302 may evaluate the predicted resource data from the each of the algorithms and determine an error score based in part on the comparison to the actual resource data values. The evaluation process may also include an error threshold where models generating error values exceeding the threshold are automatically disqualified from being selected by the initializer 1302. The initializer 1302 may then select an algorithm based at least in part on the error value and communicate the decision to the code pipeline 1310.

In some configurations, the algorithms in the set of algorithms 1332 may be selected based on recursive evaluation of the algorithms by the initializer 1302. For example, algorithms that are determined to exceed the error threshold during the evaluation done by the initializer 1302 may be excluded from the set of algorithms 1332 in future forecasting sessions. In some configurations the algorithms utilized may be support vector machine, gradient boost, a combination of stochastic gradient descent and random forest, and similar algorithms.

In some configurations, the alert communicated by the notification system 1324 comprises a report detailing the incident that triggered the alert. The report comprises a description of the trigger presented in context of the predicted resource data. The trigger description includes threshold values or event information for the resource data and the context identifies the resource bin and the time range in which the resource data could potentially exceed the threshold values or exhibit the features of a trigger event. This information is communicated through the plurality of notification routes.

In some configurations, the resource forecast module 1300 operates in real time such that the selection of the algorithm 1306, the generation of the model and the predicted results, and the communication of the alerts occurs within a configured threshold performance interval (e.g., 200 milliseconds) following the submission of the forecasting scenario 1336. The resource forecast module 1300 may operate on a server-less runtime where requests, for example the forecasting scenario 1336, are fulfilled with low latency. The resource forecast module 1300 may incorporate real-time payment (RTP) rails in conjunction with real time decisioning points that are implemented by the selected forecast model 1314 to output to the code pipeline 1310. An RTP rail, as is known in the art, is similar to Automated Clearing House (ACH) payment rail systems but operates through an API providing faster feedback to a resource provider institution for updating resource data. This allows for lower latency access to data for processing by the initializer 1302.

Figure 14:
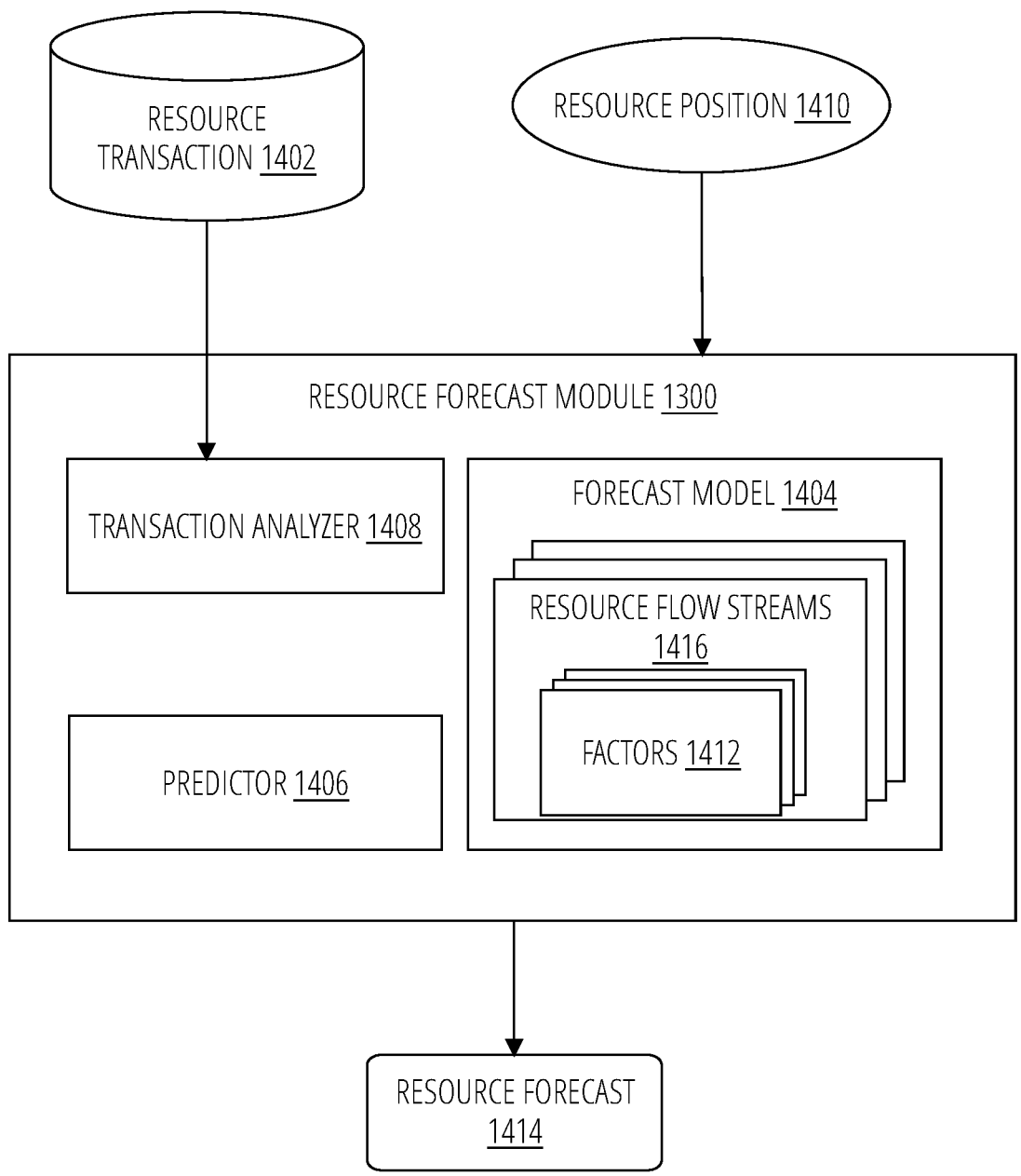
FIG. 14 depicts the resource forecast module 1300 in additional aspects.

FIG. 14 depicts additional aspects of the resource forecast module 1300 in accordance with one embodiment. The resource forecast module 1300 comprises a transaction analyzer 1408, a predictor 1406, and a forecast model 1404 comprising one or more resource flow streams 1416. Each resource flow stream comprises one or more factors 1412. The resource forecast module 1300 utilizes a resource position 1410 and a set of resource transactions 1402 to determine a resource forecast 1414.

The transaction analyzer 1408 may determine a relationship between one or more historical resource transactions 1402 and one or more resource flow streams 1416. The transaction analyzer 1408, in certain embodiments, may determine how one or more resource transactions affects the one or more resource flow streams 1416.

The transaction analyzer 1408 may identify a particular set of resource transactions based on a name or description for the transaction(s) (e.g., payroll, inventory, etc.,), the source of the transaction (e.g., resource provider institution, EPR system, etc.,) as well as other identifiable metadata associated with the particular transactions. In addition, the transaction analyzer 1408 may further identify transactions to associate with a resource flow stream by a tag associated with an existing stream such that a resource flow stream may include resource transaction 1402 associated with more than one resource flow stream.

The predictor 1406 may project a future resource flow for each of the one or more resource flow streams 1416 based on the relationship between a resource transaction 1402 and the resource flow stream 1416. The predictor 1406 may project a resource flow stream value at a time in the future, provided that each associated factor occurs between not and that time in the future. In one embodiment, the predictor 1406 employs and/or comprises a neural network. In certain embodiments, the neural network used may be pre-trained. In other embodiments, the neural network used may train based on resource transaction available to the predictor 1406 and feedback from a user. Neural network architectures and training techniques for producing predictions/classifiers for resource flows are known in the art.

The one or more factors 1412 associated with each of the resource flow stream 1416 may be utilized to adjust the projected future resource flow from each resource flow stream 1416. The one or more factors 1412 associated with a resource flow stream describe a behavior within a resource flow stream, such as a change in the inflow or outflow of a resource of interest during a period of time. The behavior may be associated with an event such as the release of a new product, and the tracked change could be a change in revenue that directly correlates with the sale of the new product. By including factors, the predictor 1406 may be able to adjust the resource flow stream to account for the changes and improve the predicted future resource flow for each resource flow stream.

The factors may also be configured to account for rate changes such as a percentage change factor. A percentage change factor is a factor configured to change the resource flow for a resource flow stream by a predetermined percentage over time with a predefined frequency. For example, in one embodiment, the percentage change factor comprises a percentage increase, for example, 0.025%, with a frequency interval, such as each future pay period or every three days. In another example, in one embodiment, the percentage change factor comprises a percentage decrease, for example, 0.025%, with frequency interval, such as each seven days. The factors may also be configured to account for expected time shift changes for certain behaviors through a time shift factor.

In certain embodiments, the user interface 1502 may include an editor (not shown) for a user to use to define, edit, revise, copy, and delete forecast models 1404. In one embodiment, the forecast model 1404 comprises logic configured to project how the one or more factors 1412 impact one or more resource flow streams 1416 based on the resource transactions 1402. In one embodiment, the forecast model 1404 comprises a set of transaction streams and relations between them and factors that influence how the forecast model 1404 changes in view of different transactions or other input information.

The forecast model 1404, in one embodiment, may project an impact of future resource flows for each of the resource flow streams 1416. The predictor 1406 may then combine the resource flow predictions into the forecast model 1404 for one or more of the resource flow streams 1416. The predictor 1406 may utilize the resource position 1410 as a current resource position and generate a resource forecast 1414 based thereon, using the forecast model 1404. The resource forecast 1414 describes the future resource flow for the selected resource flow stream 1416 including the adjustments based on each associated one or more factors 1412 relative to a current resource position.

Figure 15:
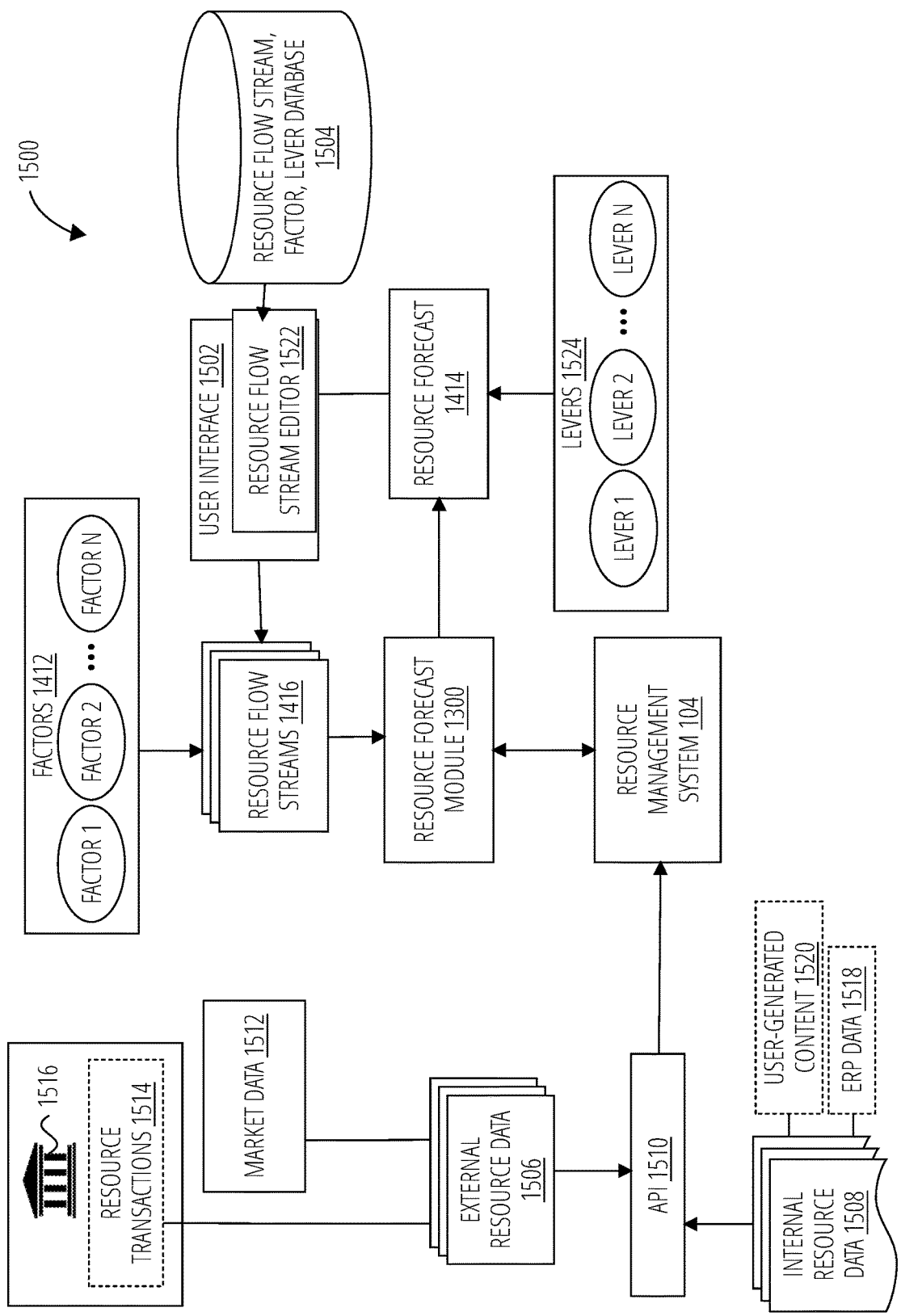
FIG. 15 depicts a resource forecasting system 1500 in accordance with one embodiment.

FIG. 15 depicts a resource forecasting system 1500 in accordance with one embodiment. The resource forecasting system 1500 comprises a resource management system 104, a resource forecast module 1300, a user interface 1502, and a resource flow stream, factor, lever database 1504.

The resource management system 104 may comprise any hardware, circuit, component, module, logic, device, or apparatus configured, programmed, designed, arranged, or engineered to manage, combine, and operate on account transaction data, market data, and company system data each accessible using application programming interfaces (APIs) to analyze transactions and provide resource level metrics for a company. The resource management system 104 receives external resource data 1506 and internal resource data 1508 through an API 1510. The external resource data 1506 comprises market data 1512 and resource transactions 1514 from at least one resource provider institution 1516. The internal resource data 1508, in one embodiment, comprises ERP system resource data 1518 and user-generated content 1520, such as spreadsheet data.

The resource management system 104 may determine a resource position for a company based on at least resource transactions 1514 and ERP system resource data 1518. The resource management system 104 communicates the resource position to the resource forecast module 1300.

The resource forecast module 1300 generates a resource forecast 1414. In one embodiment, the resource forecast module 1300 may use a resource flow stream 1416 to generate the resource forecast 1414.

The resource forecast module 1300 may comprise any hardware, circuit, component, module, logic, device, or apparatus configured, programmed, designed, arranged, or engineered to determine a resource forecast 1414. The resource forecast 1414, in one embodiment, comprises a projection, or an estimate, of the timing and amounts of resource inflows and outflows over a specific time period. In some instances, the forecast or projection may predict inflows and outflows over a period of a month, quarter, and/or year. The resource forecast 1414, is useful for decision makers to decide if a company needs to borrow, lease, or purchase, how much, when, and on what terms. A resource flow forecast may also be called resource flow budget or resource flow projection.

The resource forecast module 1300, in one embodiment, generates a resource forecast 1414 based on the resource position and one or more resource flow streams 1416, each resource flow stream may represent a resource flow for one aspect of the company, and each resource flow stream may comprise one or more factors, each factor configured to affect an associated resource flow stream in the future.

The user interface 1502 enables a user to view, review, or edit a resource forecast 1414, a resource flow stream 1416, or adjust or revise resource forecasts. The user interface 1502 may provide a user access to a resource flow stream editor 1522. The user interface 1502 may also include a graphical user interface configured to display information to the user to help them to access, configure, control, execute, or terminate a resource forecast 1414, a resource flow stream 1416, one or more factors 1412, and/or one or more levers 1524. The resource flow stream editor 1522 enables a user to select a resource flow stream 1416 as well as one or more factors 1412 associated with the resource flow stream 1416 to be utilized by the resource forecast module 1300.

In one embodiment, a user may design, configure, build, or edit a consolidated resource forecast. A consolidated resource forecast is a combination of one or more resource forecasts. The user interface 1502 provides the user with a variety of options for working with resource forecasts. In one embodiment, a user may copy or duplicate an existing resource forecast to create a new resource forecast and alter various attributes and/or characteristics of the new resource forecast. For example, a user may add, remove, or modify one or more levers relating to the new resource forecast. The levers may affect a resource forecast at a macro level.

In one embodiment, a resource flow stream, factor, lever database 1504 may comprise a data structure that allows for storage, access, modification, and retrieval of data corresponding to a plurality of resource flow streams 1416 as well as the one or more factors 1412 associated with each resource flow stream 1416 accessible by the user through the user interface 1502. The resource flow stream, factor, lever database 1504 may also include zero or more levers (e.g., one or more levers 1524) that associate with one or more resource forecasts 1414. The resource flow stream, factor, lever database 1504 may be configured to assist a user in identifying a resource flow stream 1416 and in identifying one or more factors 1412 from various sources including external resource data 1506 and internal resource data 1508 to be utilized by the resource management system 104. The resource flow stream, factor, lever database 1504 may also track and store associations between resource flow streams 1416 and one or more factors 1412 and resource forecasts 1414 and one or more levers 1524.

In the resource forecasting system 1500, the user interface 1502 configures a resource flow stream 1416 for use by the resource forecast module 1300 through a resource flow stream editor 1522. The resource flow stream editor 1522 allows users to select, define, and/or edit cash streams and factors for a generating a resource forecast 1414. In one embodiment, a user may generate the resource flow stream and/or factors from scratch. In another embodiment, one or more of the resource flow streams and/or factors may come from the resource flow stream, factor, lever database 1504.

Each resource flow stream 1416 may represent a resource flow for one aspect of the company. In one embodiment, each resource flow stream comprises, or is associated with, one or more factors 1412. A factor may be configured to affect an associated resource flow stream in the future, depending on what attributes or characteristics the factor relates to. In one embodiment, the one or more factors 1412 associated with a resource flow stream describe a behavior in a resource flow stream 1416 such as a change in the inflow or outflow of resources during a period of time. The behavior may be associated with an event such as the release of a new product and the tracked change could be a change in revenue that directly correlates with the sale of the new product. By including factors, the resource forecast module 1300 may adjust the resource flow stream to account for the changes over time and thereby improve a resource forecast 1414.

Figure 16:
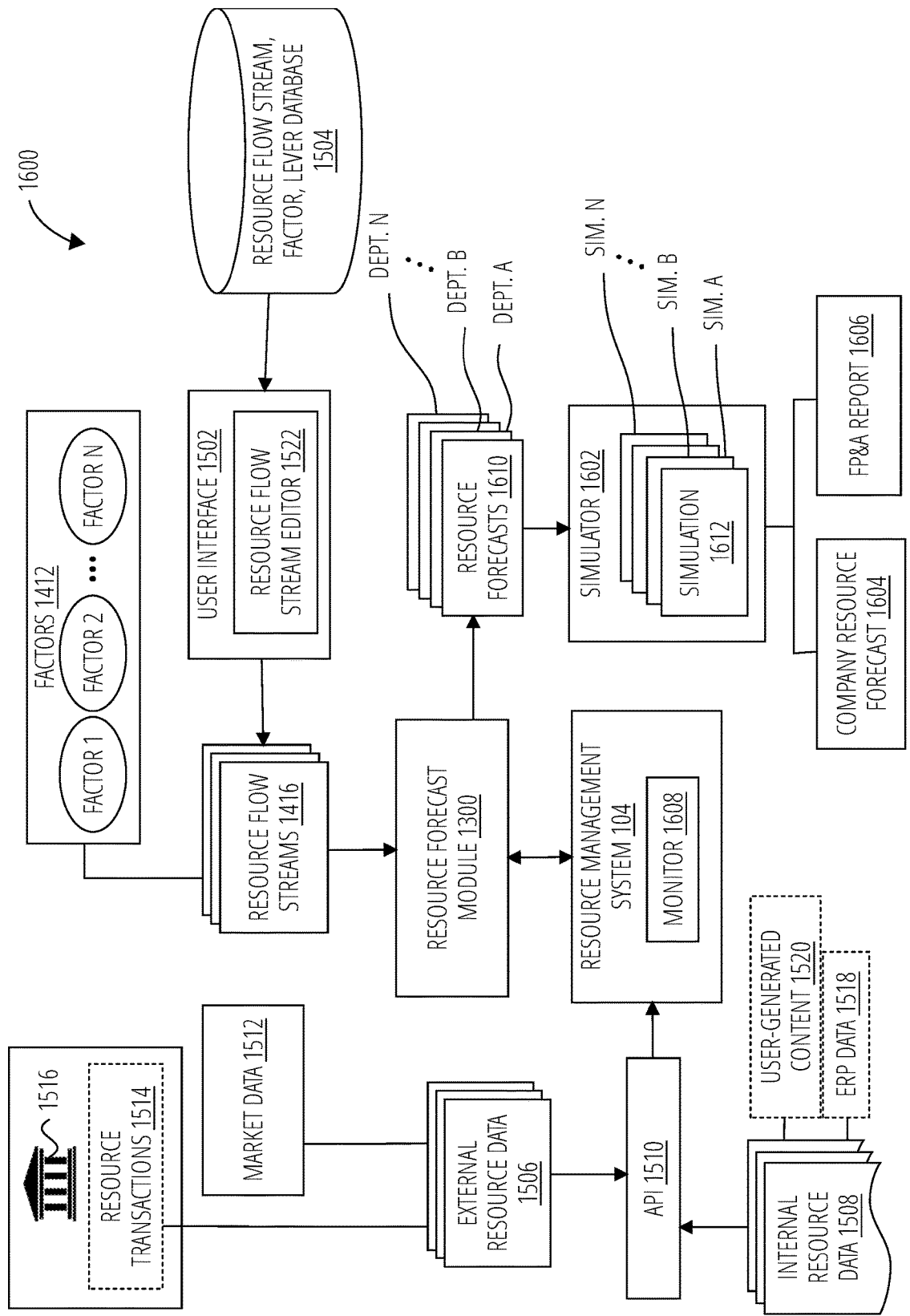
FIG. 16 depicts a resource forecasting system 1600 in accordance with one embodiment.

FIG. 16 depicts a resource forecasting system 1600 in accordance with one embodiment. The resource forecasting system 1600 comprises components in common with the resource forecasting system 1500, and additionally a simulator 1602 to transform resource forecasts 1610 into simulations 1612 and generate a company resource forecast 1604 and an FP&A report 1606. Additionally, the resource management system 104 of the resource forecasting system 1600 further comprises a monitor 1608.

The resource forecast module 1300 may communicate with the resource management system 104 to retrieve resource position data and resource transactions that correspond to the one or more resource flow streams 1416. The resource forecast module 1300 may generate the plurality of resource forecast 1610. In the depicted configuration, the resource management system 104 includes a monitor 1608. The monitor 1608 may identify resource flow streams 1416 from resource transactions collected by the resource management system 104. Alternatively, or in addition, the resource forecast module 1300 may include the monitor 1608. In one embodiment, the monitor 1608 uses tags to identify resource flow streams 1416.

The resource forecast module 1300 provides the plurality of resource forecasts 1610 to a simulator 1602. The simulator 1602 may combine the plurality of resource forecasts 1610 into a simulation 1612 and generate a company resource forecast 1604 based on the plurality of resource forecasts 1610. The simulator 1602 may generate a plurality of simulations from one or more resource forecasts 1610. In certain configurations, the simulator 1602 may generate an FP&A report 1606 from the one or more resource forecasts 1610.

In certain embodiments, the resource forecasting system 1600 may include a processor and a volatile memory media storing instructions that, when executed by the processor, cause the processor to perform certain operations. The instructions may cause the processor to retrieve historical resource transaction from a prior day over a network by way of an application programming interface (API 1510) from a one or more of a resource provider institution 1516 for each resource account of the company, and internal resource data 1508 such as resource data from an enterprise resource planning (ERP) system, and user-generated content such as transaction records from an spread sheet.

The processor may be instructed to determine a relationship between historical resource transactions and a resource flow stream for a specific part of a company as defined by, or in, a forecast model, such as forecast model 1404. The forecast model may include one or more resource flow stream 1416 where each of the resource flow streams may include one or more one or more factors 1412. The processor may be instructed to predict one or more future resource flows for the one or more resource flow streams defined by the forecast model by applying the relationship.

The processor may be instructed to generate a direct method generated resource forecast for a predefined future time period (e.g., next quarter, or next year) based on a direct method of financial resource flow process using the one or more future resource flows. The processor may be instructed to present the direct method generated resource forecast to a user.

In certain embodiments, the resource forecasting system 1600 may display a revised direct method generated resource forecast in response to a daily change in one or more of historical resource transactions, ERP system resource data, and user-generated content.

Figure 17:
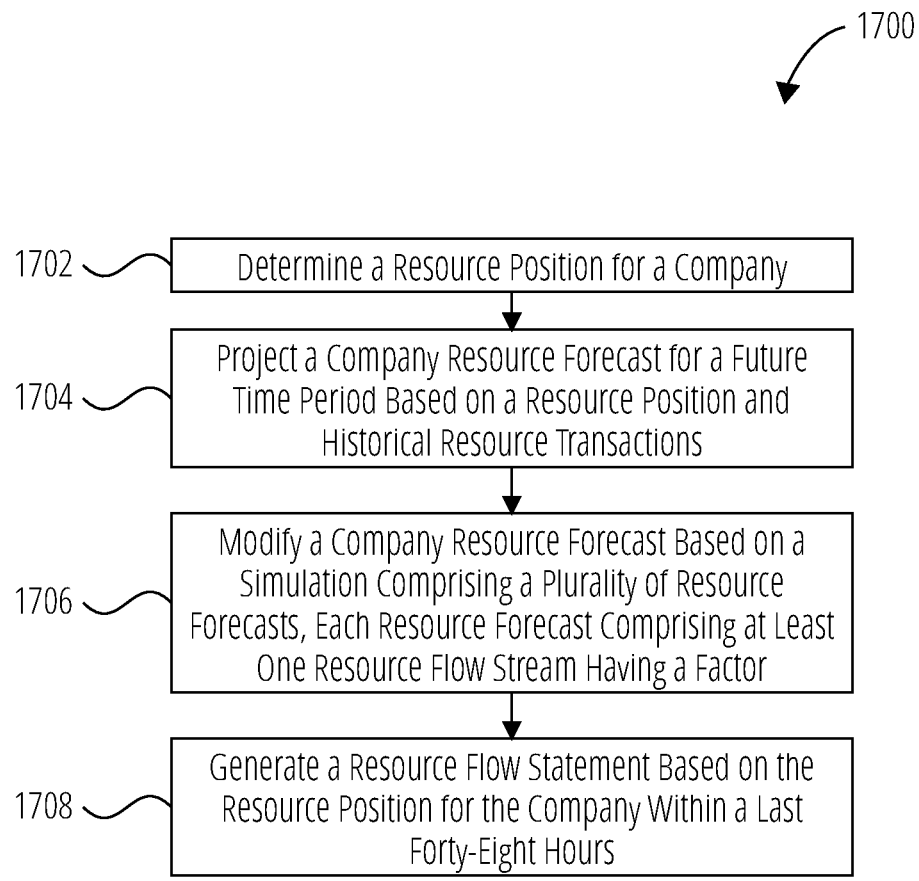
FIG. 17 depicts a method 1700 in accordance with one embodiment.

FIG. 17 depicts a method 1700 in accordance with one embodiment. In step 1702, the method 1700 determines a resource position for a company. In step 1704, the method 1700 projects a company resource forecast for a future time period based on the resource position and historical resource transactions. In step 1706, The method 1700 modifies the company resource forecast based on a simulation comprising a plurality of resource forecasts, each resource forecast comprising at least one resource flow stream having a factor. In step 1708, the method 1700 generates a resource flow statement based on a resource position for the company within the last forty-eight hours.

In some configurations, a step 1704 of projecting the company resource forecast may include gathering historical resource transactions from resource provider institutions, and ERP system resource data from ERP systems. Step 1704 may include modifying the resource position for the company on the basis that the future resource flows are directly correlated with past resource flows that generated the resource position. In some configurations, the resource flow stream may include a resource uses stream. In some configurations, the resource flow stream may include a resource sources stream.

Figure 18:
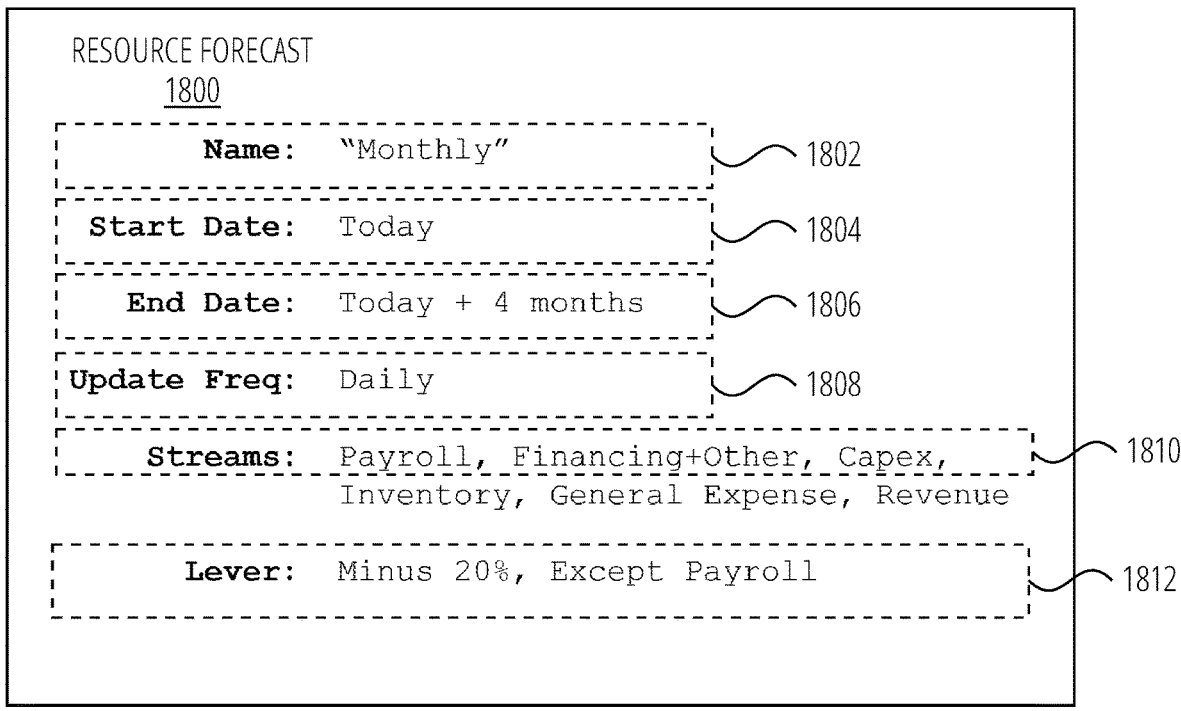
FIG. 18 depicts a resource forecast 1800 in accordance with one embodiment.

FIG. 18 depicts a resource forecast 1800 in accordance with one embodiment. The resource forecast 1800 defines factors associated with reach resource flow stream. The resource forecast 1800 comprises a forecast name 1802, a start date 1804, an end date 1806, an update frequency 1808, and at least one resource flow stream 1810.

The forecast name 1802 may be a description of a time period that a user wishes to view or another name that a user wishes to assign. For instance, a user may name the forecast name 1802 after an applicable month or fiscal quarter to allow easy identification of the forecast when searched or reviewed. The start date 1804 and the end date 1806 are the date ranges for generating the resource forecast 1800, for instance the start date 1804 in the resource forecast 1800 indicates that start of the range is "today" and the end of the range is "today+4 months" indicating that the range is 4 month range. The start date 1804 and end date 1806 may be used by a resource forecast module 1300 to determine which historical resource transactions are applicable to a particular resource forecast 1800.

The update frequency 1808 is the interval by which the forecast information updates the collected resource data. In some instances, the information may be updated based on the data collected from the resource management system 104 or updated based on changes from the user interface 1502. In some instances, the update frequency 1808 updates the forecast model 1404 with the updated financial information.

The resource flow stream 1810 identifies one or more resource flow streams in the historical resource transaction data from to use for generating a resource forecast 1414. Examples of resource flow streams that may be included in a resource forecast 1800 are: a payroll stream, a financing stream, a capex stream, an inventory stream, a general expenses stream, a revenue stream, a leasehold income stream, and the like. In certain embodiments, a resource forecast 1800 may include one or more resource flow streams. In another embodiment, a resource forecast 1800 may include no resource flow streams 1810.

A resource forecast 1800 may include no levers 1812, or may include one or more levers 1812. The levers 1812 represent a macro level characteristic that influences or is related to the resource forecast 1800.

A lever is similar to a factor with the main difference that, in one embodiment, a lever affects each resource flow stream and each factor that a resource forecast may have. In another embodiment, a lever may affect one or more resource flow streams and one or more factors of a resource forecast. A lever is a condition, criteria, or attribute setting that a user may configure on a resource forecast. Levers enable the configuration of new or revised resource forecasts that model the impact of a particular lever.

For example, suppose an external event or condition (also referred to as a business scenario) in a particular geographic region, industry, or sector exists or has a high risk of occurring in the future. The event or condition could be a negative or a positive influence on resource flow for a business. Suppose the event or condition represents a recession risk, a negative influence on resource flow, a team (one or more users) may want to execute scenarios to understand the impact on resource levels and liquidity in the event that overall business decreases by 20%. Such a resource forecast may facilitate a determination of how deep to cut into certain operations.

To determine such a resource forecast, a user may setup or configure a specific "lever" defined, for example, to state "minus 20%, except payroll." Such a lever would then calculate and adjust down all non-payroll streams within the resource forecast by 20%. This permits a finance team to quickly model out a scenario, defined by the lever setting, without configuring many factors applied to each individual stream within the resource forecast.

In another example, suppose a company is anticipating a loss of $50M over the next year and has only had $30M in the bank. Such a company could define a lever to adjust a resource forecast at a macro level or a certain period of time to model the resource position in the future. Such a resource forecast may help the business determine operational adjustments in order to keep the company solvent.

Levers provide an easy macro level way for resource forecasts to take account of macro level adjustments. A user can adjust a lever to see a resource forecast based on a positive resource flow or negative resource flow impact the impact from changes to 10%, then 15%, then 20%, etc. The adjustments are reflected in the resource forecast and associated consolidated resource metrics.

In one embodiment, a set of levers may be predefined. In another embodiment, a user may edit predefined levers. In another embodiment, a user may define levers that reflect the changes specific to the user's needs.

Figure 19:
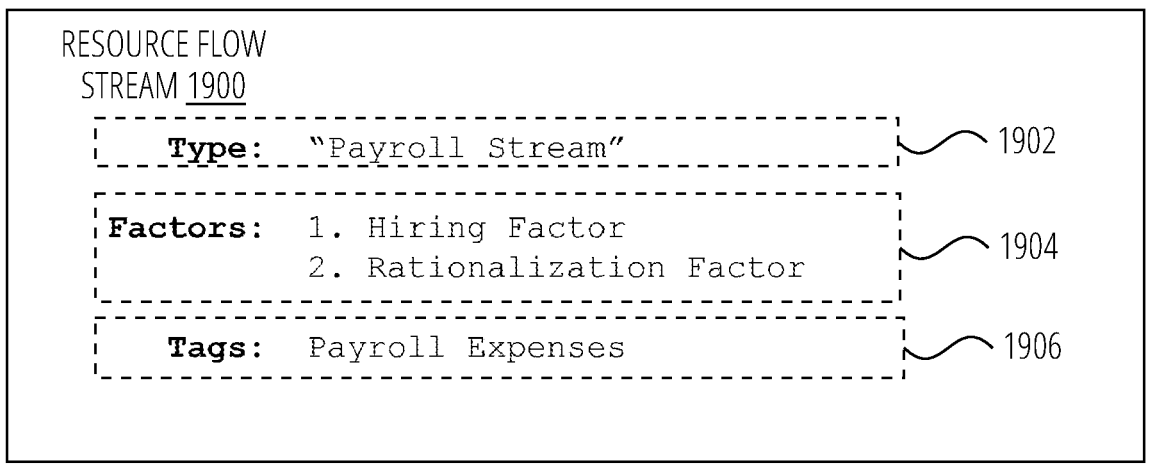
FIG. 19 depicts a resource flow stream 1900 in accordance with one embodiment.

FIG. 19 depicts a resource flow stream 1900 in accordance with one embodiment. The resource flow stream 1900 identifies a category of resource data collected by a resource management system 104 to be utilized to generate the resource forecast, among other uses. In some instances, a user enters assumptions for the resource forecast by configuring the one or more resource streams for a specific part of a company.

The resource flow stream 1900 comprises a resource flow stream type 1902 may include one or more factors 1904. The resource flow stream type 1902 indicates the category of resource data, or business activity, or part of a company, to be utilized to generate the resource forecast. For instance, "payroll stream" indicates that the resource flow stream to be utilized corresponds to payroll related resource flows. Other types of resource flow streams 1900 may include an "power stream", a "bandwidth stream", an "OpEx stream", and so on.

The one or more factors 1904 may parameterize potential conditions, restrictions, limitations, presumptions, and/or assumptions, that may affect the resource flow associated with the stream. For instance, the example factors 1904 may include a hiring factor and a rationalization factor that may each modify the resource flow of the resource flow stream during a resource forecast time period. The hiring factor defines a potential change in the resource flow of the stream, as new hires are brought into the company. Each new hire would increase certain expenses associated with payroll, for example, and each layoff would affect capacity of design resources for engineering, potentially. The rationalization factor may affect the resource flow stream 1900 as reorganization actions of the company may lead to an expansion, or reduction, in the work force, thus an increase, or decrease, in expenses and operational capacity. In certain embodiments, a resource flow stream 1900 may include no factors.

In one aspect, a resource flow stream 1900 with no factors may be used in a resource forecast as a standalone resource flow stream. Later a user may or may not add a factor to a resource flow stream without any factors. A resource flow stream 1900 without a factor may capture natural influences on the resource flow stream 1900 without applying a particular factor.

In some configurations, the resource flow stream 1900 may include a tag 1906. The tag 1906 may be an identifier corresponding to a named search parameter or metadata parameter utilized by the resource management system 104 to classify certain resource transactions. The resource forecast 1414 may use a tag 1906 to identify resource transactions associated with the resource flow stream. For instance, the tag 1906 indicates "Payroll Expenses" which may indicate the named search parameter for the resource management module to use to identify a particular class of resource transaction associated with the payroll stream. The resource flow stream 1900 may include a combination of resource source transactions and resource use transactions. A tag 1906 may be used to include both resource source transactions and resource use transactions. For example, a resource flow stream 1900 may include two tags 1906, one associated exclusively with drains on a resource (e.g., resource use transactions) and one associated exclusively with enhancements to a resource (e.g., resource source transactions).

Figure 20:
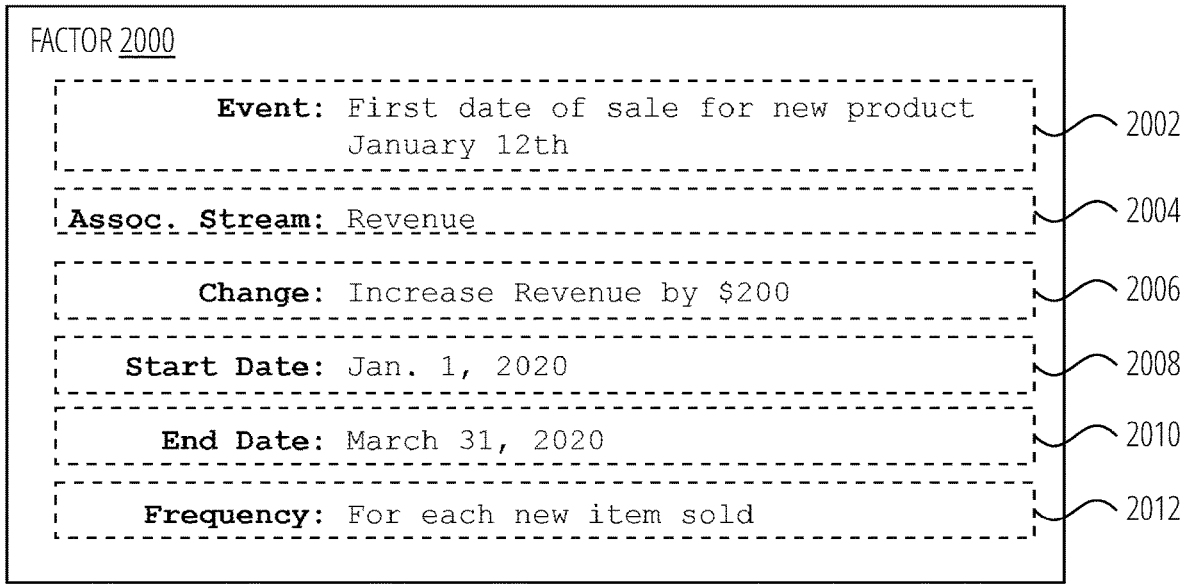
FIG. 20 depicts a factor 2000 in accordance with one embodiment.

FIG. 20 depicts one example of a factor 2000 in accordance with one embodiment. The factor 2000 may be a collection of parameters, settings, or values that impact a resource flow of at least one steam. The factor 2000, in one embodiment, includes an event 2002, at least one associated resource flow stream 2004, a change 2006, a start date 2008, an end date 2010, and a frequency 2012.

The event 2002 may describe a future event that may modify the resource flow of at least one particular resource flow stream. For instance, the event 2002 may describe a future first date of sale for a new product and indicate that date of the event is January 12th. In one embodiment, a date in the event 2002 description may be used by the resource forecast module 1300 to determine whether or not a particular factor 2000 applies. In another embodiment, the event 2002 may be a text description and the resource forecast module 1300 may use the start date 2008 to track when to apply a particular factor 2000.

The associated resource flow stream 2004 may indicate the resource flow stream affected by the future event. For instance, the associated resource flow stream 2004 describes "Revenue" as the resource flow stream affected by the event 2002.

The change 2006 is a parameter that defines how the resource flow stream, associated resource flow stream 2004, will change due to the factor 2000. In this example, the change 2006 is for an increase in revenue by $200. Alternatively, or in addition, the change may indicate a decrease in a value related to the resource flow. For example, the factor 2000 may be a cost factor and occurrence of the event may result in a decrease to cash on hand. The change 2006 may indicate the magnitude of the change explicitly or the magnitude may be derived from resource transaction referenced by the resource forecast module 1300. For example, sales of a product may be captured in a different factor and the amount of increase in revenue may be based on the sale price less a predefined cost of goods sold (COGS).

In certain factors, the change 2006 may be associated with a frequency 2012 of change (e.g., "for each new item sold"). The frequency 2012 may also be configured to a time period such as each month, or each week, or each quarter.

The start date 2008 and the end date 2010 may indicate a date range during which the change 2006 may occur, and/or when the factor 2000 is applicable. For instance, the start date 2008 indicates that the start of the range is Jan. 1, 2020, and end date 2010 is Mar. 31, 2020.

In some embodiments, the factor 2000 may include a percentage change factor that may impose a change on a resource flow stream resource position by a certain percentage with a certain frequency (e.g., frequency 2012).

For example, the change may be an increase or a decrease in total value of the resource flow stream by a defined percentage. In some configurations, the factor 2000 may include a time shift factor that may change a resource flow stream resource position by an amount based on an adjustment to when a resource transaction is to be completed.

Figure 21:
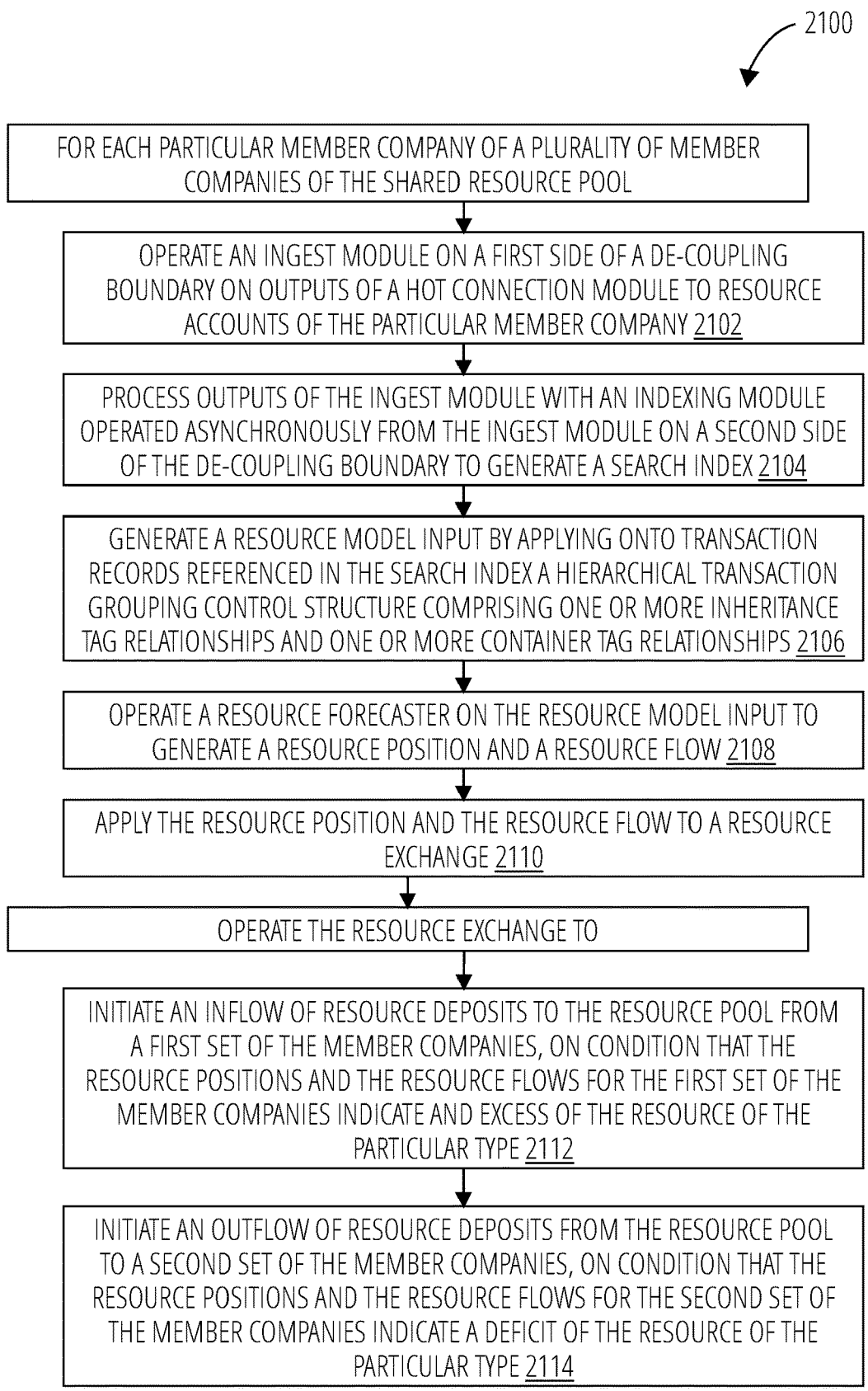
FIG. 21 depicts a process 2100 in accordance with one embodiment.

FIG. 21 depicts a process 2100 in one embodiment. For each particular member company of a plurality of member companies of the shared resource pool, the process 2100:

In block 2102, operates an ingest module on a first side of a de-coupling boundary on outputs of a hot connection module to resource accounts of the particular member company;

In block 2104, processes outputs of the ingest module with an indexing module asynchronously from the ingest module on a second side of the de-coupling boundary to generate a search index.

In block 2106, generates a resource model input by applying onto transaction records referenced in the search index a hierarchical transaction grouping control structure comprising one or more inheritance tag relationships and one or more container tag relationships.

In block 2108, operates a resource forecaster on the resource model input to generate a resource position and a resource flow. In block 2110, process 2100 applies the resource position and the resource flow to a resource exchange.

The resource exchange is then operated to:

In block 2112, initiate an inflow of resource deposits to the resource pool from a first set of the member companies, on condition that the resource positions and the resource flows for the first set of the member companies indicate and excess of the resource of the particular type.

In block 2114, initiate an outflow of resource deposits from the resource pool to a second set of the member companies, on condition that the resource positions and the resource flows for the second set of the member companies indicate a deficit of the resource of the particular type.

Embodiments of a serverless cloud computing platform may, in accordance with this disclosure, implement a shared resource pool for a resource of a particular type. Such a computing platform may include a resource management system with logic configured, for each particular member company of a plurality of member companies of the shared resource pool, to operate an ingest module on a first side of a de-coupling boundary on outputs of a hot connection module to resource accounts of the particular member company; process outputs of the ingest module with an indexing module asynchronously from the ingest module on a second side of the de-coupling boundary to generate a search index; and generate a resource model input by applying onto transaction records referenced in the search index a hierarchical transaction grouping control structure comprising one or more inheritance tag relationships and one or more container tag relationships.

The computing platform may further include a resource forecaster with logic configured to transform the resource model input into a resource position and a resource flow, and a resource exchange with logic configured to: receive the resource position and the resource flow; initiate an inflow of resource deposits to the resource pool from a first set of the member companies, on condition that the resource positions and the resource flows for the first set of the member companies indicate and excess of the resource of the particular type; and initiate an outflow of resource deposits from the resource pool to a second set of the member companies, on condition that the resource positions and the resource flows for the second set of the member companies indicate a deficit of the resource of the particular type.

The computing platform may further include logic configured to determine a credit profile for each particular company of the second set of member companies; and logic configured to apply repayment terms to the outflow of resource deposits to the particular company based on the credit profile for the particular company.

The computing platform may further include logic configured to credit an account of each member company having a positive balance in the resource pool with a pro rata share of an interest payment based on the outflow.

The computing platform may further include an application program interface to a resource provider institution for maintaining the resource pool, the application program interface enabling the resource provider institution to loan resources to the resource pool in response to a level of the resource pool falling below a configured threshold.

The computing platform may further include logic to configure triggers for initiating the inflows and the outflows.

The hot connection module of the computing platform may be responsive to a plurality of metadata control settings for disparate computer server systems, the control settings implementing cadence rules for connection to and data transfer from the disparate computer server systems. The hot connection module may be configured to execute a connection cadence on each of the disparate computer server systems based on the cadence rules.

The computing platform may include a serverless cloud computing platform with logic to determine the resource position based on at least resource transactions and ERP system resource data for the particular member company. The serverless cloud computing platform may further include logic to generate a resource forecast based on the resource position and one or more resource flow streams of the resource flow for the particular member company, each resource flow stream may include one or more factors. Each factor may include a percentage change factor configured to change a resource flow stream resource position by a percentage with a frequency. The factor may include a time shift factor configured to change a resource flow stream resource position by an amount based on changing a time that a resource transaction is to be completed.

The systems disclosed herein, or particular components thereof, may in some embodiments be implemented as software comprising instructions executed on one or more programmable device. By way of example, components of the disclosed systems may be implemented as an application, an app, drivers, or services. In one particular embodiment, the system is implemented as a service that executes as one or more processes, modules, subroutines, or tasks on a server device so as to provide the described capabilities to one or more client devices over a network. However the system need not necessarily be accessed over a network and could, in some embodiments, be implemented by one or more app or applications on a single device or distributed between a mobile device and a computer, for example.

Figure 22:
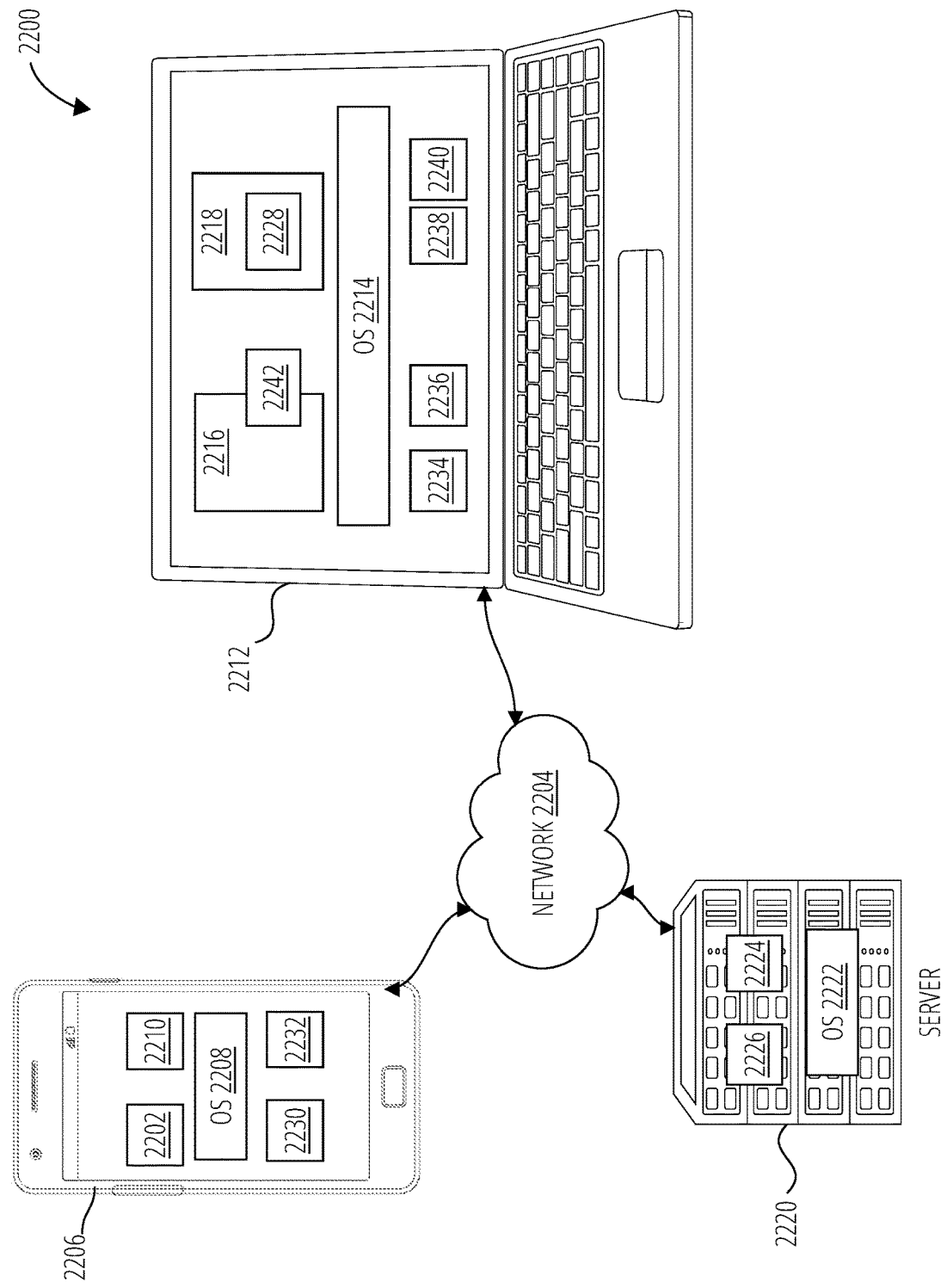
FIG. 22 depicts a client server network configuration 2200 in accordance with one embodiment.

Referring to FIG. 22, a client server network configuration 2200 depicts various computer hardware devices and software modules coupled by a network 2204 in one embodiment. Each device includes a native operating system, typically pre-installed on its non-volatile RAM, and a variety of software applications or apps for performing various functions.

The mobile programmable device 2206 comprises a native operating system 2208 and various apps (e.g., app 2202 and app 2210), one or more of which may implement the mobile application 610 (e.g., as a mobile app). A computer 2212 also includes an operating system 2214 that may include one or more library of native routines to run executable software on that device. The computer 2212 also includes various executable applications (e.g., application 2216 and application 2218). The mobile programmable device 2206 and computer 2212 are configured as clients on the network 2204. A server 2220 is also provided and includes an operating system 2222 with native routines specific to providing a service (e.g., service 2224 and service 2226) available to the networked clients in this configuration. As previously noted, various components of the ingest module 602 and/or outflow module 604 may be implemented as such services.

As is well known in the art, an application, an app, or a service may be created by first writing computer code to form a computer program, which typically comprises one or more computer code sections or modules.

A compiler is typically used to transform source code into object code and thereafter a linker combines object code files into an executable application, recognized by those skilled in the art as an "executable". The distinct file comprising the executable would then be available for use by the computer 2212, mobile programmable device 2206, and/or server 2220. Any of these devices may employ a loader to place the executable and any associated library in memory for execution. The operating system executes the program by passing control to the loaded program code, creating a task or process. An alternate means of executing an application or app involves the use of an interpreter (e.g., interpreter 2228).

In addition to executing applications ("apps") and services, the operating system is also typically employed to execute drivers to perform common tasks such as connecting to third-party hardware devices (e.g., printers, displays, input devices), storing data, interpreting commands, and extending the capabilities of applications. For example, a driver 2230 or driver 2232 on the mobile programmable device 2206 or computer 2212 (e.g., driver 2234 and driver 2236) might enable wireless headphones to be used for audio output(s) and a camera to be used for video inputs. Any of the devices may read and write data from and to files (e.g., file 2238 or file 2240) and applications or apps may utilize one or more plug-in (e.g., plug-in 2242 which may implement plug-in 614) to extend their capabilities (e.g., to encode or decode video files).

The network 2204 in the client server network configuration 2200 can be of a type understood by those skilled in the art, including a Local Area Network (LAN), Wide Area Network (WAN), Transmission Communication Protocol/Internet Protocol (TCP/IP) network, and so forth. These protocols used by the network 2204 dictate the mechanisms by which data is exchanged between devices.

Figure 23:
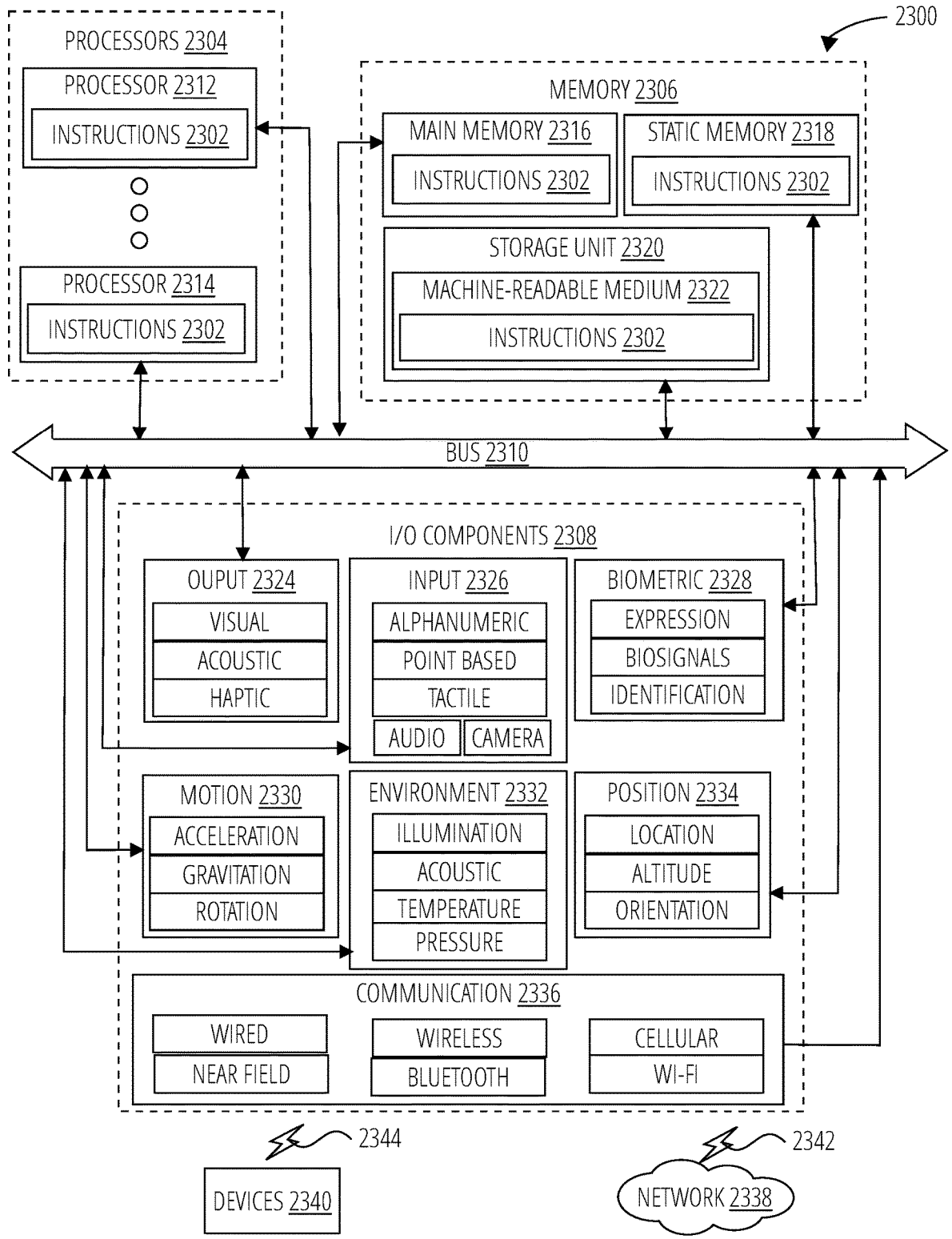
FIG. 23 depicts a machine 2300 in the form of a computer system within which a set of instructions may be executed for causing the machine to perform any one or more of the methodologies discussed herein, according to an example embodiment.

FIG. 23 depicts a diagrammatic representation of a machine 2300 in the form of a computer system within which logic may be implemented to cause the machine to perform any one or more of the functions or methods disclosed herein, according to an example embodiment.

Specifically, FIG. 23 depicts a machine 2300 comprising instructions 2302 (e.g., a program, an application, an applet, an app, or other executable code) for causing the machine 2300 to perform any one or more of the functions or methods discussed herein. For example, the instructions 2302 may cause the machine 2300 to implement the functionality described in conjunction with the distributed resource management computing platform 600, control structure 700, indexing module 630, inter-system connection scheduler logic 1000, connection cadence setting logic 1100, and hot connection logic 1200. The instructions 2302 configure a general, non-programmed machine into a particular machine 2300 programmed to carry out said functions and/or methods.

In alternative embodiments, the machine 2300 operates as a standalone device or may be coupled (e.g., networked) to other machines. In a networked deployment, the machine 2300 may operate in the capacity of a server machine or a client machine in a server-client network environment, or as a peer machine in a peer-to-peer (or distributed) network environment. The machine 2300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2302, sequentially or otherwise, that specify actions to be taken by the machine 2300. Further, while only a single machine 2300 is depicted, the term "machine" shall also be taken to include a collection of machines that individually or jointly execute the instructions 2302 to perform any one or more of the methodologies or subsets thereof discussed herein.

The machine 2300 may include processors 2304, memory 2306, and I/O components 2308, which may be configured to communicate with each other such as via one or more bus 2310. In an example embodiment, the processors 2304 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 2312 and processor 2314) to execute the instructions 2302. The term "processor" is intended to include multi-core processors that may comprise two or more independent processors (sometimes referred to as "cores") that may execute instructions contemporaneously. Although FIG. 23 depicts multiple processors 2304, the machine 2300 may include a single processor with a single core, a single processor with multiple cores (e.g., a multi-core processor), multiple processors with a single core, multiple processors with multiples cores, or any combination thereof.

The memory 2306 may include one or more of a main memory 2316, a static memory 2318, and a storage unit 2320, each accessible to the processors 2304 such as via the bus 2310. The main memory 2316, the static memory 2318, and storage unit 2320 may be utilized, individually or in combination, to store the instructions 2302 embodying any one or more of the functionality described herein. The instructions 2302 may reside, completely or partially, within the main memory 2316, within the static memory 2318, within a machine-readable medium 2322 within the storage unit 2320, within at least one of the processors 2304 (e.g., within the processor's cache memory), or any suitable combination thereof, during execution thereof by the machine 2300.

The I/O components 2308 may include a wide variety of components to receive input, provide output, produce output, transmit information, exchange information, capture measurements, and so on. The specific I/O components 2308 that are included in a particular machine will depend on the type of machine. For example, portable machines such as mobile phones will likely include a touch input device or other such input mechanisms, while a headless server machine will likely not include such a touch input device. It will be appreciated that the I/O components 2308 may include many other components that are not shown in FIG. 23. The I/O components 2308 are grouped according to functionality merely for simplifying the following discussion and the grouping is in no way limiting. In various example embodiments, the I/O components 2308 may include output components 2324 and input components 2326. The output components 2324 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2326 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 2308 may include biometric components 2328, motion components 2330, environmental components 2332, or position components 2334, among a wide array of possibilities. For example, the biometric components 2328 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 2330 may include acceleration sensor components (e.g., accelerometer), gravitation sensor components, rotation sensor components (e.g., gyroscope), and so forth. The environmental components 2332 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2334 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2308 may include communication components 2336 operable to couple the machine 2300 to a network 2338 or devices 2340 via a coupling 2342 and a coupling 2344, respectively. For example, the communication components 2336 may include a network interface component or another suitable device to interface with the network 2338. In further examples, the communication components 2336 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 2340 may be another machine or any of a wide variety of peripheral devices (e.g., a peripheral device coupled via a USB).

Moreover, the communication components 2336 may detect identifiers or include components operable to detect identifiers. For example, the communication components 2336 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2336, such as location via Internet Protocol (IP) geolocation, location via Wi-Fi® signal triangulation, location via detecting an NFC beacon signal that may indicate a particular location, and so forth.

The various memories (i.e., memory 2306, main memory 2316, static memory 2318, and/or memory of the processors 2304) and/or storage unit 2320 may store one or more sets of instructions and data structures (e.g., software) embodying or utilized by any one or more of the methodologies or functions described herein. These instructions (e.g., the instructions 2302), when executed by processors 2304, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magnetooptical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

In various example embodiments, one or more portions of the network 2338 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 2338 or a portion of the network 2338 may include a wireless or cellular network, and the coupling 2342 may be a Code Division Multiple Access (CDMA) connection, a Global System for Mobile communications (GSM) connection, or another type of cellular or wireless coupling. In this example, the coupling 2342 may implement any of a variety of types of data transfer technology, such as Single Carrier Radio Transmission Technology (1×RTT), Evolution-Data Optimized (EVDO) technology, General Packet Radio service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 2302 and/or data generated by or received and processed by the instructions 2302 may be transmitted or received over the network 2338 using a transmission medium via a network interface device (e.g., a network interface component included in the communication components 2336) and utilizing any one of a number of well-known transfer protocols (e.g., hypertext transfer protocol (HTTP)). Similarly, the instructions 2302 may be transmitted or received using a transmission medium via the coupling 2344 (e.g., a peer-to-peer coupling) to the devices 2340. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2302 for execution by the machine 2300, and/or data generated by execution of the instructions 2302, and/or data to be operated on during execution of the instructions 2302, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

LISTING OF DRAWING ELEMENTS

- 100 resource co-operative system
- 102 resource provider institutions
- 104 resource management system
- 106 system data
- 108 resource position
- 110 resource flow log
- 112 market data
- 114 treasury management
- 116 API
- 118 processor
- 120 volatile memory
- 122 user-generated content
- 124 resource flow statement
- 126 communication module
- 128 output module
- 130 controller
- 200 resource pooling co-operative system
- 202 resource pool
- 204 resource co-operative
- 206 resource exchange
- 208 resource provider institutions
- 210 resource forecaster
- 212 transaction manager
- 214 first set of member companies
- 216 second set of member companies
- 218 resource pool loan
- 220 resource deposits
- 222 resource
- 300 user interface
- 302 company's projected resource balance
- 304 inflows and outflows
- 306 optimal level of resource to be maintained
- 308 resource in excess
- 310 shortfalls
- 312 scenario
- 314 resource categories
- 316 indicator
- 318 chart
- 320 graph
- 322 selector
- 324 time range selector
- 326 snapshot button
- 400 user interface
- 402 amount
- 500 process
- 502 block
- 504 block
- 506 block
- 600 distributed resource management computing platform
- 602 ingest module
- 604 outflow module
- 606 de-coupling boundary
- 608 user interface logic
- 610 mobile application
- 612 web application
- 614 plug-in
- 616 scheduler
- 618 web service integration
- 620 data storage and processing engine
- 622 cadence rules
- 624 hot connection module
- 626 normalizing module
- 628 raw data set
- 630 indexing module
- 632 arbitrator
- 634 outflow engine
- 636 meta-indexer
- 638 alert generator
- 640 tagging logic
- 642 tag descriptor setting
- 644 tag parameters
- 646 metadata
- 648 dynamic preview window 650 index
652 user application program interface
700 control structure
702 parent tag
704 parent tag
706 parent tag
708 elemental tag
710 elemental tag
712 elemental tag
714 exclusion tags
802 queries
804 search engine
806 indexed transactions
808 results
810 control structure
812 parameter tag
814 term
816 parameter
818 combination tag
820 parameter tag
822 parameter tag
824 combination tag
826 exclusion tag
828 parameter tag
830 parameter tag
832 term
834 parameter
836 collision detection
900 computer system routine
902 block
904 block
906 block
1000 inter-system connection scheduler logic
1002 block
1004 block
1006 block
1008 decision block
1100 connection cadence setting logic
1102 block
1104 block
1106 block
1108 block
1110 block
1200 hot connection logic
1202 block
1204 block
1206 decision block
1208 block
1300 resource forecast module
1302 initializer
1304 controller
1306 algorithm
1308 user interface
1310 code pipeline
1312 resource bins
1314 forecast model
1316 resource data
1318 predicted resource data
1320 event monitor
1322 reporting module
1324 notification system
1326 email
1328 SMS
1330 Web API
1332 set of algorithms
1334 trigger database
1336 forecasting scenario
1402 resource transaction
1404 forecast model
1406 predictor
1408 transaction analyzer
1410 resource position
1412 one or more factors
1414 resource forecast
1416 resource flow stream
1500 resource forecasting system
1502 user interface
1504 resource flow stream, factor, lever database
1506 external resource data
1508 internal resource data
1510 API
1512 market data
1514 resource transactions
1516 resource provider institution
1518 ERP system resource data
1520 user-generated content
1522 resource flow stream editor
1524 one or more levers
1600 resource forecasting system
1602 simulator
1604 company resource forecast
1606 FP&A report
1608 monitor
1610 resource forecast
1612 simulation
1700 method
1702 step
1704 step
1706 step
1708 step
1800 resource forecast
1802 forecast name
1804 start date
1806 end date
1808 update frequency
1810 resource flow stream
1812 levers
1900 resource flow stream
1902 resource flow stream type
1904 factor
1906 tag
2000 factor
2002 event
2004 associated resource flow stream
2006 change
2008 start date
2010 end date
2012 frequency
2100 process
2102 block
2104 block
2106 block
2108 block
2110 block
2112 block
2114 block
2200 client server network configuration
2202 app
2204 network
2206 mobile programmable device
2208 operating system
2210 app
2212 computer
2214 operating system 2216 application
2218 application
2220 server
2222 operating system
2224 service
2226 service
2228 interpreter
2230 driver
2232 driver
2234 driver
2236 driver
2238 file
2240 file
2242 plug-in
2300 machine
2302 instructions
2304 processors
2306 memory
2308 I/O components
2310 bus
2312 processor
2314 processor
2316 main memory
2318 static memory
2320 storage unit
2322 machine-readable medium
2324 output components
2326 input components
2328 biometric components
2330 motion components
2332 environmental components
2334 position components
2336 communication components
2338 network
2340 devices
2342 coupling
2344 coupling "Algorithm" refers to any set of instructions configured to cause a machine to carry out a particular function or process.

"App" refers to a type of application with limited functionality, most commonly associated with applications executed on mobile devices. Apps tend to have a more limited feature set and simpler user interface than applications as those terms are commonly understood in the art.

"Application" refers to any software that is executed on a device above a level of the operating system. An application will typically be loaded by the operating system for execution and will make function calls to the operating system for lower-level services. An application often has a user interface but this is not always the case. Therefore, the term 'application' includes background processes that execute at a higher level than the operating system.

"Application program interface" refers to instructions implementing entry points and return values to a module.

"Arbitrator" refers to logic that manages contention for a shared computing, communication, or memory resource in a computer system.

"Assembly code" refers to a low-level source code language comprising a strong correspondence between the source code statements and machine language instructions. Assembly code is converted into executable code by an assembler. The conversion process is referred to as assembly. Assembly language usually has one statement per machine language instruction, but comments and statements that are assembler directives, macros, and symbolic labels may also be supported.

"Cadence rule" refers to a logic setting that controls a rate and/or frequency of connection establishment and data transfers between disparate computer server systems.

"Characteristic" refers to any property, trait, quality, or attribute of an object or thing. Examples of characteristics include, but are not limited to, condition, magnitude, degree, direction, speed, rate of change, readiness for use, unreadiness for use, size, weight, composition, feature set, and the like.

"Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Communication module" refers to any hardware, software, firmware, circuit, electronic component, module, logic, device, or apparatus configured, programmed, designed, arranged, or engineered to manage, direct, and/or control analog or digital communications between two electronic components. A communication module may use a variety of signal transfer media including wired and wireless interconnects (such as Bluetooth, Radio Frequency (RF), or Wi-fi technology (e.g. radio or chip)).

"Company resource forecast" refers to a resource forecast that is representative of all cash related activities for a company.

"Compiled computer code" refers to object code or executable code derived by executing a source code compiler and/or subsequent tools such as a linker or loader.

"Compiler" refers to logic that transforms source code from a high-level programming language into object code or in some cases, into executable code.

"Computer" refers to any computing device. Examples of a computer include, but are not limited to, a personal computer, a laptop, a tablet, a desktop, a server, a main frame, a super computer, a computing node, a virtual computer, a hand held device, a smart phone, a cell phone, a system on a chip, a single chip computer, and the like.

"Computer code" refers to any of source code, object code, or executable code.

"Computer code section" refers to one or more instructions.

"Computer program" refers to another term for 'application' or 'app'.

"Connection cadence" refers to the rate and/or frequency of connection establishment for data transfers between disparate computer server systems.

"Connection scheduler" refers to logic that establishes connections between disparate computer server systems according to a connection cadence determined by cadence rules.

"Controller" refers to a hardware, device, component, element, circuitry, logic, or circuit configured to manage and control operation of another software, hardware, firmware, system, sub-system, device, apparatus, or logic unit, component, device, or component.

"Credit profile" refers to a collection of resource data that represents a borrower, or potential borrowers, history of securing and repaying loans. "Credit profile" may be synonymous with "credit report".

"Credit report" refers to an organizing data set comprising transaction activity, and resource debt and/or credit levels for an organization.

"Credit score" refers to a numerical value or range of numerical values that provide a metric of a borrower's ability to repay a loan of resources.

"Daemon" refers to logic that executes without a user interface and which performs a background function in a computer system.

"De-coupling boundary" refers to an interface between two communicating logic components that decouples the rate at which one component transforms its inputs to outputs from the rate at which the other component transforms its inputs to outputs.

"Direct method" refers to one of two techniques used to generate a resource flow statement. The "direct method" uses actual inflows and outflows from the company's operations. Accrual accounting recognizes revenue or other resources when earned versus when the received from a customer. Conversely, the direct method measures only the resources received and the outflows. The inflows and outflows are netted to arrive at the resource flow.

"Disparate computer server systems" refers to physically distinct and separate computer systems operated by distinct and separate companies and accessible over distinct and separate communication channels from one another.

"Driver" refers to low-level logic, typically software, that controls components of a device. Drivers often control the interface between an operating system or application and input/output components or peripherals of a device, for example.

"Engine" refers to logic that transforms inputs into outputs with adjustable performance. Engine logic may "idle" if no inputs are available for transformation.

"ERP" is an acronym for "enterprise resource planning".

"ERP system" refers to one or more systems comprising hardware, software, interfaces, databases, either alone or in combination, that collect, track, and report on business process information for a company. In general, ERP systems provide access to data that support the business processes in real-time, or near real time. ERP systems and the data they manage may support a variety of business functions or departments, including but not limited to, manufacturing, purchasing, sales, accounting, human resources, supply chain management, project management, customer relationship management, and the like. ERP systems that support accounting manage resource data relating to the general ledger, fixed assets, accounts payable, accounts receivable, resource management, and the like. Examples of ERP systems, ERP system vendors, and/or components that are part of an ERP system, include, but are not limited to, Netsuite®, Salesforce.com®, Workday, SAP, Oracle, Microsoft Dynamics, and the like.

"ERP system resource data" refers to resource data supplied by an ERP system representing resource levels, inflows, and outflows. Examples include open accounts receivable (A/R) and accounts payable (A/P) invoices; open purchase orders (POs) with both vendors and customers; payments made by payment type and related details such as payment date; vendor payment terms (payables) and/or customer collections terms (receivables); chart of accounts, including account codes by vendor and/or customer for expense and revenue recognition, respectively, and the like; and transactions posted to a ledger that can be used to aid in reconciliation.

"Executable" refers to a file comprising executable code. If the executable code is not interpreted computer code, a loader is typically used to load the executable for execution by a programmable device.

"Executable code" refers to Instructions in a ready-to-execute form by a programmable device. For example, source code instructions in non-interpreted execution environments are not executable code because they must usually first undergo compilation, linking, and loading by the operating system before they have the proper form for execution. Interpreted computer code may be considered executable code because it can be directly applied to a programmable device (an interpreter) for execution, even though the interpreter itself may further transform the interpreted computer code into machine language instructions.

"Factor" refers to a machine configuration setting applied to influence the content of a resource flow stream.

"File" refers to a unitary package for storing, retrieving, and communicating data and/or instructions. A file is distinguished from other types of packaging by having associated management metadata utilized by the operating system to identify, characterize, and access the file.

"Firmware" refers to software logic embodied as processor-executable instructions stored on volatile memory media and/or non-volatile memory media.

"Forecast model" refers to a set of parameters, data values, assumptions, and events, or potential events, that a user wants to use as a basis for generating a resource forecast.

"Future resource flow" refers to a resource flow for a distinct point in time or a period of time in the future.

"Hardware" refers to logic embodied as analog and/or digital circuitry.

"Historical resource transaction" refers to a resource transaction that occurs in the past.

"Hot connection module" refers to logic that maintains a communication session open across configured timeout conditions.

"Indexing module" refers to logic that transforms received data signals into a searchable index.

"Ingest module" refers to logic that opens and operates communication sessions to pull data from disparate computer server systems.

"Instructions" refers to symbols representing commands for execution by a device using a processor, microprocessor, controller, interpreter, or other programmable logic. Broadly, 'instructions' can mean source code, object code, and executable code. 'instructions' herein is also meant to include commands embodied in programmable read-only memories (EPROM) or hard coded into hardware (e.g., 'micro-code') and like implementations wherein the instructions are configured into a machine memory or other hardware component at manufacturing time of a device.

"Interpreted computer code" refers to Instructions in a form suitable for execution by an interpreter.

"Interpreter" refers to an interpreter is logic that directly executes instructions written in a source code scripting language, without requiring the instructions to a priori be compiled into machine language. An interpreter translates the instructions into another form, for example into machine language, or into calls to internal functions and/or calls to functions in other software modules.

"Lever" refers to a characteristic or attribute relating to a resource forecast. A lever is similar to a factor, except that a lever affects an entire forecast (e.g., all streams and factors) at a macro level.

"Library" refers to a collection of modules organized such that the functionality of all the modules may be included for use by software using references to the library in source code.

"Linker" refers to Logic that inputs one or more object code files generated by a compiler or an assembler and combines them into a single executable, library, or other unified object code output. One implementation of a linker directs its output directly to machine memory as executable code (performing the function of a loader as well).

"Loader" refers to Logic for loading programs and libraries. The loader is typically implemented by the operating system. A typical loader copies an executable into memory and prepares it for execution by performing certain transformations, such as on memory addresses.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Machine language" refers to Instructions in a form that is directly executable by a programmable device without further translation by a compiler, interpreter, or assembler. In digital devices, machine language instructions are typically sequences of ones and zeros.

"Memory" refers to any hardware, circuit, component, module, logic, device, or apparatus configured, programmed, designed, arranged, or engineered to retain data. Certain types of memory require availability of a constant power source to store and retain the data. Other types of memory retain and/or store the data when a power source is unavailable.

"Metadata control setting" refers to settings that control the establishment of secure connections between disparate computer server systems.

"Metadata control settings" refers to settings that control the establishment of secure connections between disparate computer server systems.

"Module" refers to a computer code section having defined entry and exit points. Examples of modules are any software comprising an application program interface, drivers, libraries, functions, and subroutines.

"Neural network" refers to any logic, circuitry, component, chip, die, package, module, system, sub-system, or computing system configured to perform tasks by imitating biological neural networks of people or animals. Neural network, as used herein, may also be referred to as artificial neural network (ANN). Examples of neural networks that may be used with various embodiments of the disclosed solution include, but are not limited to, convolutional neural networks, feed forward neural networks, radial basis neural network, recurrent neural networks, modular neural networks, and the like.

A neural network may include both the logic, software, firmware, and/or circuitry for implementing the neural network as well as the data and metadata for operating the neural network. One or more of these components for a neural network may be embodied in one or more of a variety of repositories, including in one or more files, databases, folders, or the like.

The neural network used with embodiments disclosed herein may employ one or more of a variety of learning models including, but not limited to, supervised learning, unsupervised learning, and reinforcement learning. These learning models may employ various backpropagation techniques.

"Non-volatile memory" refers to shorthand name for non-volatile memory media. In certain embodiments, non-volatile memory media refers to the non-volatile memory media and the logic, controllers, processor(s), state machine(s), and/or other periphery circuits that manage the non-volatile memory media and provide access to the non-volatile memory media.

"Non-volatile memory media" refers to any hardware, device, component, element, or circuit configured to maintain an alterable physical characteristic used to represent a binary value of zero or one after a primary power source is removed.

"Normalizing module" refers to logic that transforms data received from disparate computer server systems in various and different formats into a common format.

"Object code" refers to the computer code output by a compiler or as an intermediate output of an interpreter. Object code often takes the form of machine language or an intermediate language such as register transfer language (RTL).

"On-demand company resource forecasts" refers to a resource forecast that is generated in response to a user request.

"Operating system" refers to Logic, typically software, that supports a device's basic functions, such as scheduling tasks, managing files, executing applications, and interacting with peripheral devices. In normal parlance, an application is said to execute "above" the operating system, meaning that the operating system is necessary in order to load and execute the application and the application relies on modules of the operating system in most cases, not vice-versa. The operating system also typically intermediates between applications and drivers. Drivers are said to execute "below" the operating system because they intermediate between the operating system and hardware components or peripheral devices.

"Outflow engine" refers to engine logic utilized by the outflow module.

"Outflow module" refers to logic that services on-demand or scheduled requests for structured data for utilization by client apps and applications to generate structured user interfaces and graphical visualizations.

"Percentage change factor" refers to a factor configured to change the resource flow for a resource stream by a predetermined percentage over time with a predefined frequency. For example, In one embodiment, the percentage change factor comprises a percentage increase, for example, 0.025%, with a frequency interval, such as each pay period. For example, In one embodiment, the percentage change factor comprises a percentage decrease, for example, 0.025%, with frequency interval, such as each future pay period.

"Plug-in" refers to software that adds features to an existing computer program without rebuilding (e.g., changing or re-compiling) the computer program. Plug-ins are commonly used for example with Internet browser applications.

"Process" refers to software that is in the process of being executed on a device.

"Processor" refers to any circuitry, component, chip, die, package, or module configured to receive, interpret, decode, and execute machine instructions. Examples of a processor may include, but are not limited to, a central processing unit, a general-purpose processor, an application-specific processor, a graphics processing unit (GPU), a field programmable gate array (FPGA), application Specific Integrated Circuit (ASIC), System on a Chip (SoC), virtual processor, processor core, and the like.

"Programmable device" refers to any logic (including hardware and software logic) who's operational behavior is configurable with instructions.

"Pushing" refers to implementing a data transfer over a link or across a boundary independently of receiving a request or trigger for the data transfer from the target of the data transfer.

"Relationship" refers to a magnitude and rate of change in either a positive or negative direction for a resource position of a resource flow stream. In one embodiment, the relationship is based at least in part on historical resource transactions. In another embodiment, the relationship is based at least in part on historical resource transactions for a particular resource flow stream.

"Resource account" refers to an account with an institution for maintaining and tracking resource levels.

"Resource bin" refers to a storage location that holds resources and/or records of resource transactions.

"Resource co-operative" refers to an association of persons or legal entities united to meet their common resource needs.

"Resource data" refers to any data relating to or representative of a resource transaction that occurred in the past, in a present resource transaction, or at a future resource transaction.

"Resource exchange" refers to a common site, location, platform, system, and/or tool, configured to complete a resource transaction relating to the receiving or providing of resources to at least one party.

"Resource flow" refers to the inflows and outflows that a company, or part of a company, undertakes during a given time period. A "company" is any organization as that term is commonly understood.

"Resource flow log" refers to a resource transaction statement that provides aggregate data regarding all resource inflows a company, or part of a company, receives from its ongoing operations and external investment sources. It also includes all resource outflows that pay for business activities and investments during a given period.

"Resource flow statement" refers to a resource transaction statement that provides aggregate data regarding all cash inflows a company, or part of a company, receives from its ongoing operations and external investment sources. It also includes all cash outflows that pay for business activities and investments during a given period.

"Resource flow stream" refers to a projected resource flow for a specific part of a company. In one embodiment, at a broad level, the resource flow represents resource flow for all operations of a company.

A resource flow stream is a projection of resource data representing resource flows, in or out, relating to a particular type of business transaction, such as income or expenses. The claimed solutions may generate streams in a number of ways, including, without limitation, auto-generated with tags, user-defined scripts that a serverless cloud computing platform may execute, or manually with user-generated content using entered data or user uploaded files, such as a spreadsheet.

A resource flow is a grouping of resource transactions and other business activity that affects a company's resource position, whereas a stream is a subset of that grouping of resource transactions and other business activity that affects a company's resource position.

Examples of resource flow streams include, but are not limited to, energy consumption streams, bandwidth utilization streams, data storage streams, revenue streams, general expenses streams, accounts payable streams, accounts receivable streams, inventory streams, capital expenditures streams, payroll streams, and financing streams.

"Resource forecast" refers to a projection of a resource position of a company at a specific future time, or over a specific future period of time.

"Resource forecast module" refers to any hardware, circuit, component, module, logic, device, or apparatus configured, programmed, designed, arranged, or engineered to determine a resource forecast.

"Resource forecaster" refers to any hardware, circuit, component, module, logic, device, or apparatus configured, programmed, designed, arranged, or engineered to determine a resource forecast and/or a resource position at a point in time in the future.

"Resource pool" refers to a collection of resources stored for ease of input from and output to a plurality of organizations.

"Resource pool loan request" refers to a request from a company to a resource pool to obtain a resource loan. A resource pool loan request may include terms for the loan. In certain embodiments, the terms may be predefined and may be set at default amounts for the amount or range, time of the loan, interest rate, and repayment terms.

"Resource pooling system" refers to a system configured to manage deposits of resources from participating members of a resource exchange and to manage issuance of credits for resources from a resource pool.

"Resource position" refers to the amount of resources held by a company or on behalf of the company by an associated resource provider institution at any specific point in time.

"Resource provider institution" refers to a company engaged in the business of providing resources (e.g., via sales and/or loans).

"Resource sources stream" refers to a stream configured to represent exclusively transactions that result in a credit to a resource account of the company.

"Resource transaction statement" refers to records of the transaction activities and position of a company. A resource flow statement is one example of such a transaction statement that records a company's resource flow behavior.

"Resource uses stream" refers to a stream configured to represent exclusively resource transactions that result in a debit to an account of the company.

"Serverless" refers to a computing system architected such that performance scalability is enabled by configuring, either automatically or via manually configured control settings, units of resource consumption (e.g., computational units, communication bandwidth, memory) rather than by adding or removing entire computer servers.

"Serverless cloud computing platform" refers to a set of processing hardware (processors), memory hardware (non-volatile memory and/or volatile memory), storage hardware (storage devices), networking hardware, software, firmware, systems, subsystems, components, circuits, and logic configured to implement a cloud computing serverless execution model. Examples of components, systems, architectures, functionality, and logic that may be included in a serverless cloud computing platform include AWS Lambda, AWS Dynamo, AWS RDS, AWS S3, AWS Elastic Search, Amazon SNS, and/or Amazon Gateway.

"Service" refers to a process configurable with one or more associated policies for use of the process. Services are commonly invoked on server devices by client devices, usually over a machine communication network such as the Internet. Many instances of a service may execute as different processes, each configured with a different or the same policies, each for a different client.

"Simulation" refers to the representation of the behavior or characteristics of one system through the use of another system, especially a computer program designed for the purpose.

"Software" refers to Logic implemented as instructions for controlling a programmable device or component of a device (e.g., a programmable processor, controller). software can be source code, object code, executable code, machine language code. Unless otherwise indicated by context, software shall be understood to mean the embodiment of said code in a machine memory or hardware component, including "firmware" and micro-code.

"Source code" refers to a high-level textual computer language that requires either interpretation or compilation in order to be executed by a device.

"Storage device" refers to any hardware, system, sub-system, circuit, component, module, non-volatile memory media, hard disk drive, storage array, device, or apparatus configured, programmed, designed, or engineered to store data for a period of time and retain the data in the storage device while the storage device is not using power from a power supply. Examples of storage devices include, but are not limited to, a hard disk drive, FLASH memory, MRAM memory, a Solid-State storage device, Just a Bunch Of Disks (JBOD), Just a Bunch Of Flash (JBOF), an external hard disk, an internal hard disk, and the like.

"Subroutine" refers to a module configured to perform one or more calculations or other processes. In some contexts the term 'subroutine' refers to a module that does not return a value to the logic that invokes it, whereas a 'function' returns a value. However herein the term 'subroutine' is used synonymously with 'function'.

"Tag" refers to a label associated with a filter condition. An example of a filter condition is a Structured Query Language or Boolean logic setting. An example of a tag (the format is just an example) is: September Large Transactions→"amount>$100 AND 9/1/2019<=date<=9/30/2019"

"Task" refers to one or more operations that a process performs.

"Time shift factor" refers to a factor configured to change the resource flow for a resource flow stream by a calculated amount based on a timing policy for a resource transaction shifting earlier in time or later in time.

For example, In one embodiment, the time shift factor is defined such that all invoices payable by the company are shifted "x" number of days forward in time, accelerating the payments beyond a payment policy and the associated resource flow stream is adjusted by the amount that this factor changes the resource flow. For example, in another embodiment, the time shift factor is defined such that all invoices payable by the company are shifted "x" number of days backward in time, delaying the payments beyond a payment policy and the associated resource flow stream is adjusted by the amount that this factor changes the resource flow.

"Total resource balance" refers to refers to a total amount of a particular resource aggregated across each company account for that type of resource.

"Trigger" refers to any condition, criteria, or pre-requisite associated with a suitable event and/or set of circumstances for relates to the change in resource position for an operating company. An example trigger includes, but is not limited to, a passage of time, receipt of a threshold number of orders, a change in stock price, a change in account balance, among other events and/or circumstances that are possible and contemplated herein.

"User" refers to a human operator of a system.

"User interface" refers to a set of logic, components, devices, software, firmware, and peripherals configured to facilitate interactions between humans and machines and/or computing devices.

"User override" refers to a control setting by a user that preempts or replaces a system setting.

"User-generated content" refers to any resource data supplied by a user for use in managing resource flow(s) and resource flow analysis.

"Volatile memory" refers to a shorthand name for volatile memory media. In certain embodiments, volatile memory refers to the volatile memory media and the logic, controllers, processor(s), state machine(s), and/or other periphery circuits that manage the volatile memory media and provide access to the volatile memory media.

"Volatile memory media" refers to any hardware, device, component, element, or circuit configured to maintain an alterable physical characteristic used to represent a binary value of zero or one for which the alterable physical characteristic reverts to a default state that no longer represents the binary value when a primary power source is removed or unless a primary power source is used to refresh the represented binary value. Examples of volatile memory media include but are not limited to dynamic random-access memory (DRAM), static random-access memory (SRAM), double data rate random-access memory (DDR RAM) or other random access solid state memory While the volatile memory media is referred to herein as "memory media," in various embodiments, the volatile memory media may more generally be referred to as volatile memory. In certain embodiments, data stored in volatile memory media is addressable at a byte level which means that the data in the volatile memory media is organized in to bytes (8 bits) of data that each have a unique address, such as a logical address.

"Web application" refers to an application or app that is stored on a remote server and delivered over the Internet through a browser interface.

"Web integration service" refers to a container for a web service, providing an API between the web service and external logic.

"Web service" refers to a service that listens for requests (typically at a particular network port) and provides functionality (e.g., Javascript, algorithms, procedures) and/or data (e.g., HTML, JSON, XML) in response to the requests.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A method of operating a shared resource pool for a resource of a particular type, the method comprising:
   for each particular member company of a plurality of member companies of the shared resource pool:
      operating an ingest module on a first side of a de-coupling boundary on outputs of a hot connection module to resource accounts of the particular member company;
      processing outputs of the ingest module with an indexing module asynchronously from the ingest module on a second side of the de-coupling boundary to generate a search index;
      generating a resource model input by applying onto transaction records referenced in the search index a hierarchical transaction grouping control structure comprising one or more inheritance tag relationships and one or more container tag relationships,
         wherein the inheritance tag relationship indicates at least one of a vertical, parent-child relationship among related tags and a lateral, sibling-sibling relationship among the related tags, and
         wherein the container tag relationship indicates a nested relationship among the related tags;
      operating a resource forecaster on the resource model input to generate a resource position and a resource flow; and
      applying the resource position and the resource flow to a resource exchange;
   operating the resource exchange to:
      initiate an inflow of resource deposits to the resource pool from a first set of the member companies, on condition that the resource positions and the resource flows for the first set of the member companies indicate an excess of the resource of the particular type; and
      initiate an outflow of resource deposits from the resource pool to a second set of the member companies, on condition that the resource positions and the resource flows for the second set of the member companies indicate a deficit of the resource of the particular type.

2. The method of claim 1, further comprising:
   determining a credit profile for each particular company of the second set of member companies; and
   configuring terms of the outflow of resource deposits to the particular company based on the credit profile for the particular company.

3. The method of claim 1, the method further comprising:
   configuring an interest payment from the second set of member companies to the first set of member companies, the interest payment based pro rata on the inflow and the outflow.

4. The method of claim 1, further comprising:
   a resource provider institution maintaining the resource pool; and
   the resource provider institution loaning resources to the resource pool in response to a level of the resource pool falling below a configured threshold.

5. The method of claim 1, further comprising:
   configuring triggers for initiating the inflows and the outflows.

6. The method of claim 1, the hot connection module responsive to a plurality of metadata control settings for disparate computer server systems, the control settings implementing cadence rules for connection to and data transfer from the disparate computer server systems.

7. The method of claim 6, further comprising:
the hot connection module configured to execute a connection cadence on each of the disparate computer server systems based on the cadence rules.

8. The method of claim 6, further comprising:
operating a serverless cloud computing platform to determine the resource position based on at least resource transactions and ERP system resource data for the particular member company; and
operating the serverless cloud computing platform to generate a resource forecast based on the resource position and one or more resource flow streams of the resource flow for the particular member company, each resource flow stream comprising one or more factors.

9. The method of claim 8, wherein each factor comprises a percentage change factor configured to change a resource flow stream resource position by a percentage with a frequency.

10. The method of claim 8, wherein the factor comprises a time shift factor configured to change a resource flow stream resource position by an amount based on changing a time that a resource transaction is to be completed.

11. A serverless cloud computing platform implementing a shared resource pool for a resource of a particular type, the computing platform comprising:
at least one computer processor; and
a resource management system including a machine-readable medium storing non-transitory instructions that, when executed by the at least one computer processor, configure the computing platform to:
for each particular member company of a plurality of member companies of the shared resource pool:
operate an ingest module on a first side of a de-coupling boundary on outputs of a hot connection module to resource accounts of the particular member company;
process outputs of the ingest module with an indexing module asynchronously from the ingest module on a second side of the de-coupling boundary to generate a search index;
generate a resource model input by applying onto transaction records referenced in the search index a hierarchical transaction grouping control structure comprising one or more inheritance tag relationships and one or more container tag relationships,
wherein the inheritance tag relationship indicates at least one of a vertical, parent-child relationship among related tags and a lateral, sibling-sibling relationship among the related tags, and
wherein the container tag relationship indicates a nested relationship among the related tags;
a resource forecaster comprising logic configured to transform the resource model input into a resource position and a resource flow;
a resource exchange comprising logic configured to:
receive the resource position and the resource flow;
initiate an inflow of resource deposits to the resource pool from a first set of the member companies, on condition that the resource positions and the resource flows for the first set of the member companies indicate an excess of the resource of the particular type; and
initiate an outflow of resource deposits from the resource pool to a second set of the member companies, on condition that the resource positions and the resource flows for the second set of the member companies indicate a deficit of the resource of the particular type.

12. The computing platform of claim 11, further comprising:
logic configured to determine a credit profile for each particular company of the second set of member companies; and
logic configured to apply repayment terms to the outflow of resource deposits to the particular company based on the credit profile for the particular company.

13. The computing platform of claim 11, further comprising:
logic configured to credit an account of each member company having a positive balance in the resource pool with a pro rata share of an interest payment based on the outflow.

14. The computing platform of claim 11, further comprising:
an application program interface to a resource provider institution for maintaining the resource pool; and
the application program interface enabling the resource provider institution to loan resources to the resource pool in response to a level of the resource pool falling below a configured threshold.

15. The computing platform of claim 11, further comprising:
logic to configure triggers for initiating the inflows and the outflows.

16. The computing platform of claim 11, the hot connection module responsive to a plurality of metadata control settings for disparate computer server systems, the control settings implementing cadence rules for connection to and data transfer from the disparate computer server systems.

17. The computing platform of claim 16, further comprising:
the hot connection module configured to execute a connection cadence on each of the disparate computer server systems based on the cadence rules.

18. The computing platform of claim 16, further comprising:
a serverless cloud computing platform comprising logic to determine the resource position based on at least resource transactions and ERP system resource data for the particular member company; and
the serverless cloud computing platform further comprising logic to generate a resource forecast based on the resource position and one or more resource flow streams of the resource flow for the particular member company, each resource flow stream comprising one or more factors.

19. The computing platform of claim 18, wherein each factor comprises a percentage change factor configured to change a resource flow stream resource position by a percentage with a frequency.

20. The computing platform of claim 18, wherein the factor comprises a time shift factor configured to change a resource flow stream resource position by an amount based on changing a time that a resource transaction is to be completed.

21. The method of claim 1, wherein the one or more inheritance tag relationships and the one or more container tag relationships are applied post-index for enhanced performance and customization without necessitating the instrumentation of each transaction.

22. The computing platform of claim 11, wherein the one or more inheritance tag relationships and the one or more container tag relationships are applied post-index for enhanced performance and customization without necessitating the instrumentation of each transaction.

\* \* \* \* \*